US012700897B2

(12) United States Patent
Yang et al.

(10) Patent No.: US 12,700,897 B2
(45) Date of Patent: Aug. 4, 2026

(54) CODEBOOK SUBSET RESTRICTION FOR ARTIFICIAL INTELLIGENCE/MACHINE LEARNING ENABLED CHANNEL STATE INFORMATION REPORTING

(71) Applicant: Apple Inc., Cupertino, CA (US)

(72) Inventors: Weidong Yang, San Diego, CA (US); Dawei Zhang, Saratoga, CA (US); Wei Zeng, Saratoga, CA (US); Haitong Sun, Saratoga, CA (US); Huaning Niu, San Jose, CA (US); Oghenekome Oteri, San Diego, CA (US); Chunxuan Ye, San Diego, CA (US); Hong He, San Jose, CA (US)

(73) Assignee: Apple Inc., Cupertino, CA (US)

( * ) Notice: Subject to any disclaimer, the term of this patent is extended or adjusted under 35 U.S.C. 154(b) by 22 days.

(21) Appl. No.: 18/421,721

(22) Filed: Jan. 24, 2024

(65) Prior Publication Data

US 2024/0291530 A1 Aug. 29, 2024

Related U.S. Application Data

(60) Provisional application No. 63/486,933, filed on Feb. 24, 2023.

(51) Int. Cl.
*H04B 7/0456* (2017.01)
*H04B 7/06* (2006.01)

(52) U.S. Cl.
CPC ......... *H04B 7/0478* (2013.01); *H04B 7/0617* (2013.01); *H04B 7/0626* (2013.01)

(58) Field of Classification Search
CPC .................................................... H04B 7/0478
USPC .......................................................... 375/262
See application file for complete search history.

(56) References Cited

U.S. PATENT DOCUMENTS

| | | | | |
|---|---|---|---|---|
| 10,110,286 | B2 * | 10/2018 | Onggosanusi | ......... H04B 7/065 |
| 2018/0262251 | A1 * | 9/2018 | Kim | ...................... H04B 7/0626 |
| 2019/0349057 | A1 * | 11/2019 | Davydov | ............. H04B 7/0632 |
| 2020/0014446 | A1 * | 1/2020 | Tomeba | ............... H04B 7/0478 |
| 2022/0302979 | A1 * | 9/2022 | Hao | ........................ H04B 7/048 |
| 2022/0386338 | A1 * | 12/2022 | Li | ........................ H04L 5/0091 |
| 2025/0192863 | A1 * | 6/2025 | Bai | .................... H04B 7/06952 |

* cited by examiner

*Primary Examiner* — Lihong Yu

(74) *Attorney, Agent, or Firm* — Kilpatrick Townsend & Stockton LLP

(57) ABSTRACT
The present application relates to devices and components including apparatus, systems, and methods for configuring codebook subset restriction and channel state information reporting for artificial intelligence/machine learning enabled channel state information reporting.

16 Claims, 13 Drawing Sheets

500

502

504

UE

Base
Station

506

Configuration Message

508

Beam Transmissions

510

CSI Report

800

802   Receive a CSI Feedback Configuration

804   Configure the UE in accordance with the CSI Feedback Configuration

806   Perform Measurements of One or More Spatial Beams

808   Generate a CSI Feedback Report

810   Transmit the CSI Feedback Report

900

902 — Measure One or More Beams

904 — Determine a CSI Feedback Configuration

906 — Generate a CSI Feedback Report

908 — Transmit the CSI Feedback Report

1000

1002 — Generate a CSI Feedback Configuration Message

1004 — Transmit the CSI Feedback Configuration Message

1006 — Receive a CSI Feedback Report

CODEBOOK SUBSET RESTRICTION FOR ARTIFICIAL INTELLIGENCE/MACHINE LEARNING ENABLED CHANNEL STATE INFORMATION REPORTING

CROSS-REFERENCE TO RELATED APPLICATIONS

This application claims priority to U.S. provisional application No. 63/486,933, entitled "Codebook Subset Restriction for Artificial Intelligence/Machine Learning Enabled Channel State Information Reporting," filed on Feb. 24, 2023, the disclosure of which is incorporated by reference herein in its entirety for all purposes.

TECHNICAL FIELD

The present application relates to the field of wireless technologies and, in particular, to codebook subset restriction for artificial intelligence/machine learning enabled channel state information reporting.

BACKGROUND

Third Generation Partnership Project (3GPP) networks allow for base stations to utilize spatial beams to communicate with user equipments (UEs). Utilizing the spatial beams can improve transmissions between the base stations and the UEs, such as having improved reliability and/or strength of the transmissions. However, the utilization of spatial beams can cause interference with other cells, such as when a UE being communicated with via spatial beams approaches the edge of the cell of the base station providing the beam transmissions and/or other cells.

DETAILED DESCRIPTION

Figure 1:
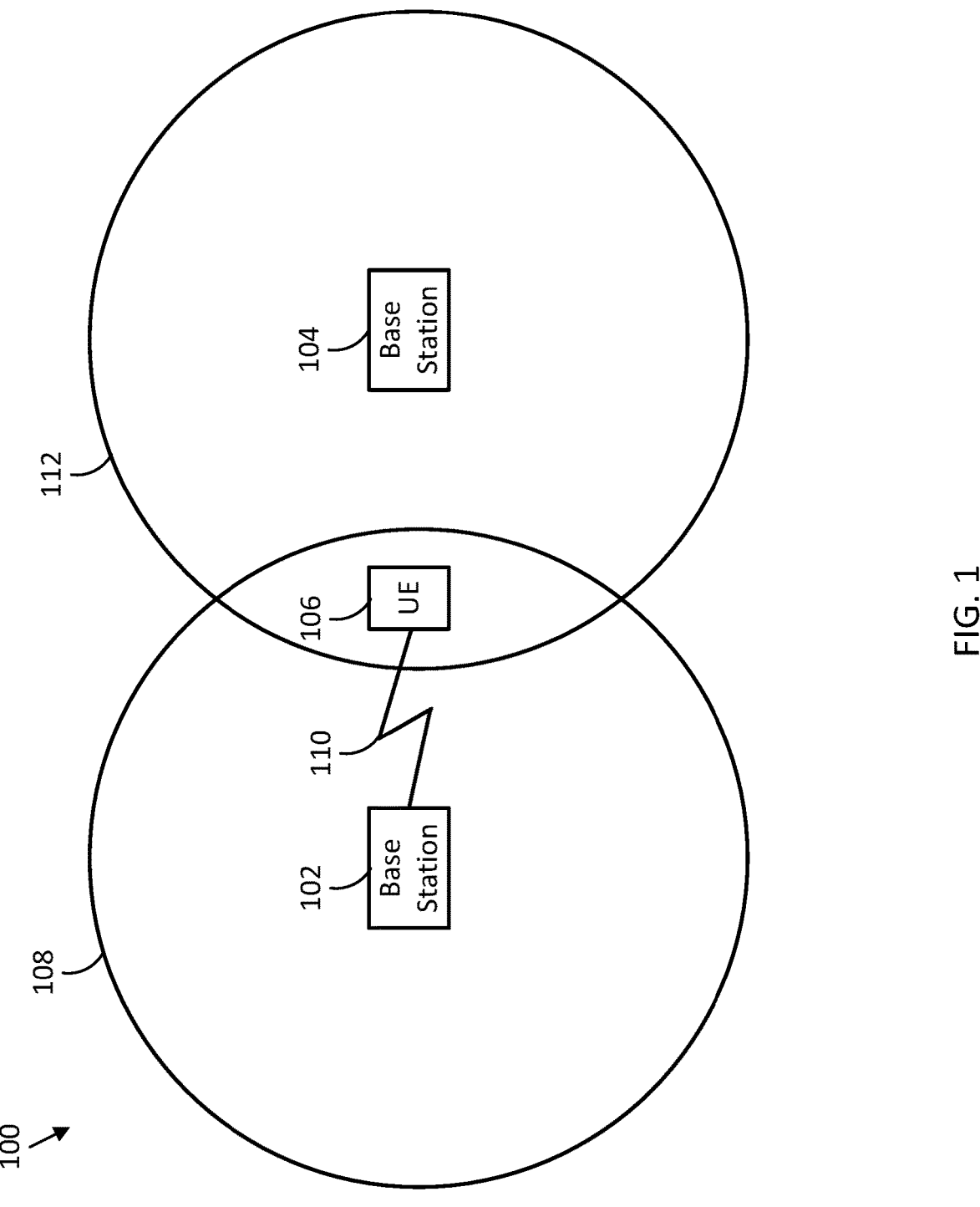
FIG. 1 illustrates an example network arrangement that can benefit from multi-cell interference mitigation in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B); and the phrase "based on A" means "based at least in part on A," for example, it could be "based solely on A" or it could be "based in part on A."

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

In new radio (NR), codebook subset restriction is supported to enable multi-cell interference mitigation. For example, a base station may apply a codebook subset restriction for beams that could cause interference with other cells. FIG. 1 illustrates an example network arrangement 100 that can benefit from multi-cell interference mitigation in accordance with some embodiments.

Figure 12:
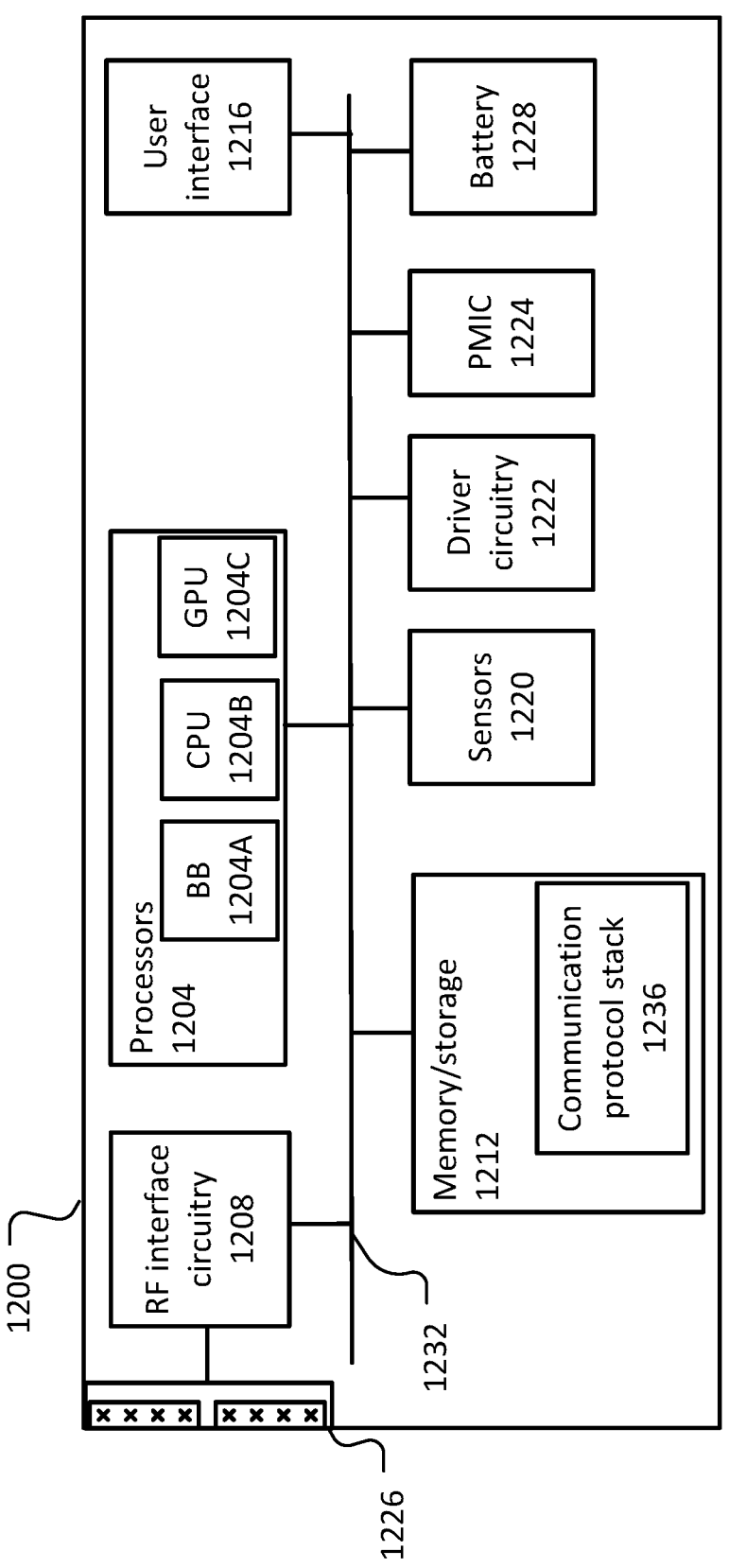
FIG. 12 illustrates an example UE in accordance with some embodiments.
Figure 13:
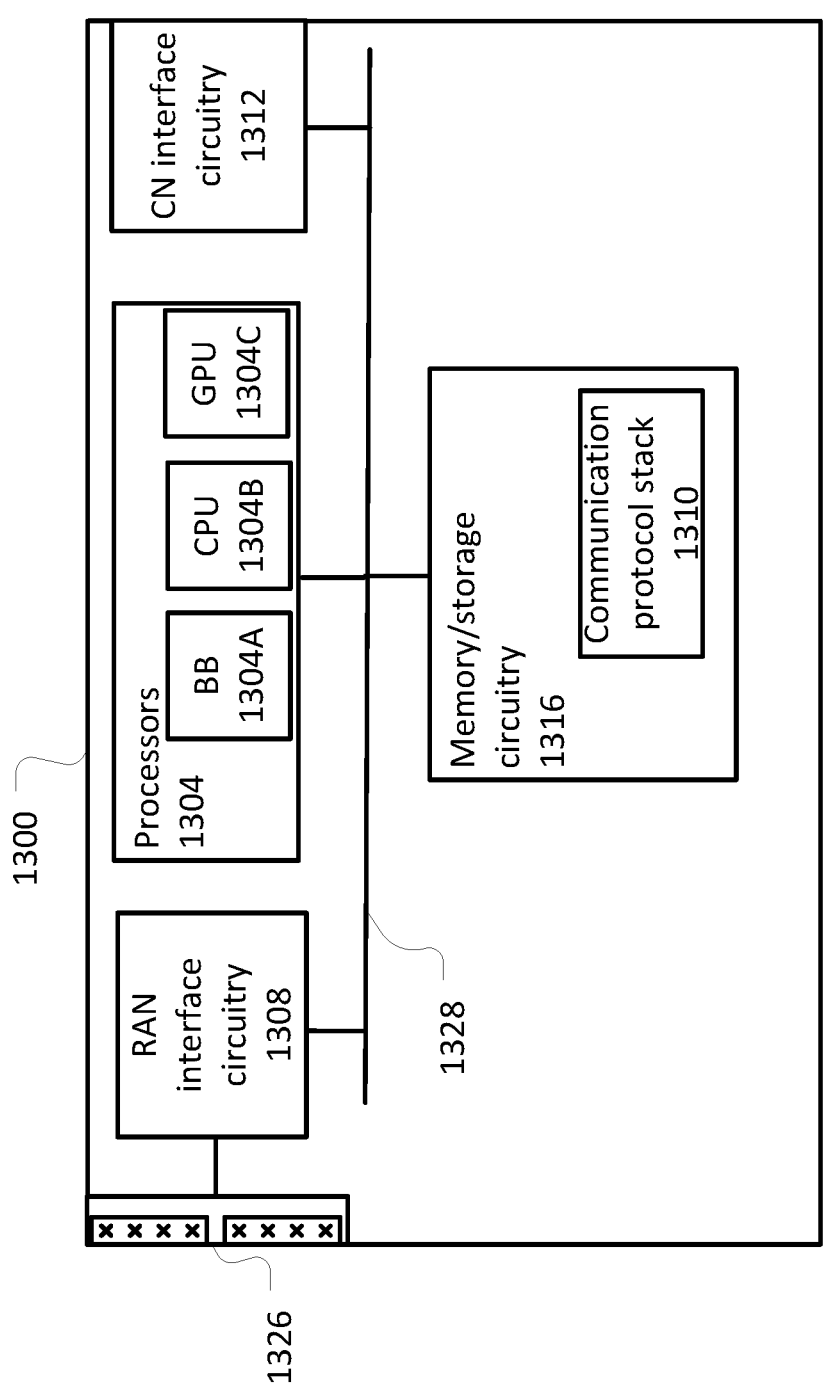
FIG. 13 illustrates an example next generation NodeB (gNB) in accordance with some embodiments.

The network arrangement 100 may include one or more base stations. For example, the network arrangement 100 includes a first base station 102 and a second base station 104 in the illustrated embodiment. Each of the first base station 102 and the second base station 104 may include one or more of the features of the next generation NodeB (gNB) 1300 (FIG. 13). The network arrangement 100 may further include one or more user equipments (UEs). For example, the network arrangement 100 includes a UE 106 in the illustrated embodiment. The UE 106 may include one or more of the features of the UE 1200 (FIG. 12).

The first base station 102 may host a first cell 108. The first cell 108 may indicate an area in which the first base station 102 may provide service to one or more UEs. The quality of service provided by the first base station 102 may be location based. For example, normal signaling of the first base station 102 may provide better service to UEs closer to the first base station 102 and weaker service towards the edges of the first cell 108. To increase the quality of service to UEs towards the edges of the first cell 108, the first base station 102 may utilize spatial beams to provide better service to the UEs towards the edges of the first cell 108.

The UE 106 may have a connection with the first base station 102 in the illustrated embodiment. Additionally, the UE 106 may be located toward an edge of the first cell 108. The first base station 102 may utilize a spatial beam 110 to communicate with the UE 106 to provide adequate service to the UE 106 located toward the edge of the first cell 108.

The second base station 104 may host a second cell 112. The second cell 112 may indicate an area in which the second base station 104 may provide service to one or more UEs. The second cell 112 may overlap with the first cell 108 (as shown in the illustrated embodiment) or may located close to the first cell 108. Additionally, the UE 106 may be located within both the first cell 108 and the second cell 112 (as shown in the illustrated embodiment) or may be located with the first cell 108 and near the second cell 112.

Due to the location of the UE 106 near the second cell 112, the spatial beam 110 may cause interference with transmissions from the second base station 104 when the spatial beam 110 is transmitted at full power. Accordingly, the first base station 102 may determine that the power of transmission of the spatial beam 110 is to be restricted to reduce the chance of interference or the interference of the spatial beam 110 with transmissions from the second base station 104. The first base station 102 may implement codebook subset restriction to restrict the maximum power at which the spatial beam 110 may be transmitted.

For a network deployment, it is expected codebook subset restriction is used regardless of whether a legacy channel state information (CSI) feedback scheme or artificial intelligence (AI) based scheme is used. For example, the base stations within a network deployment (such as the network arrangement 100) may implement codebook subset restriction whether or not a legacy CSI feedback scheme or AI based CSI feedback scheme.

Figure 2:
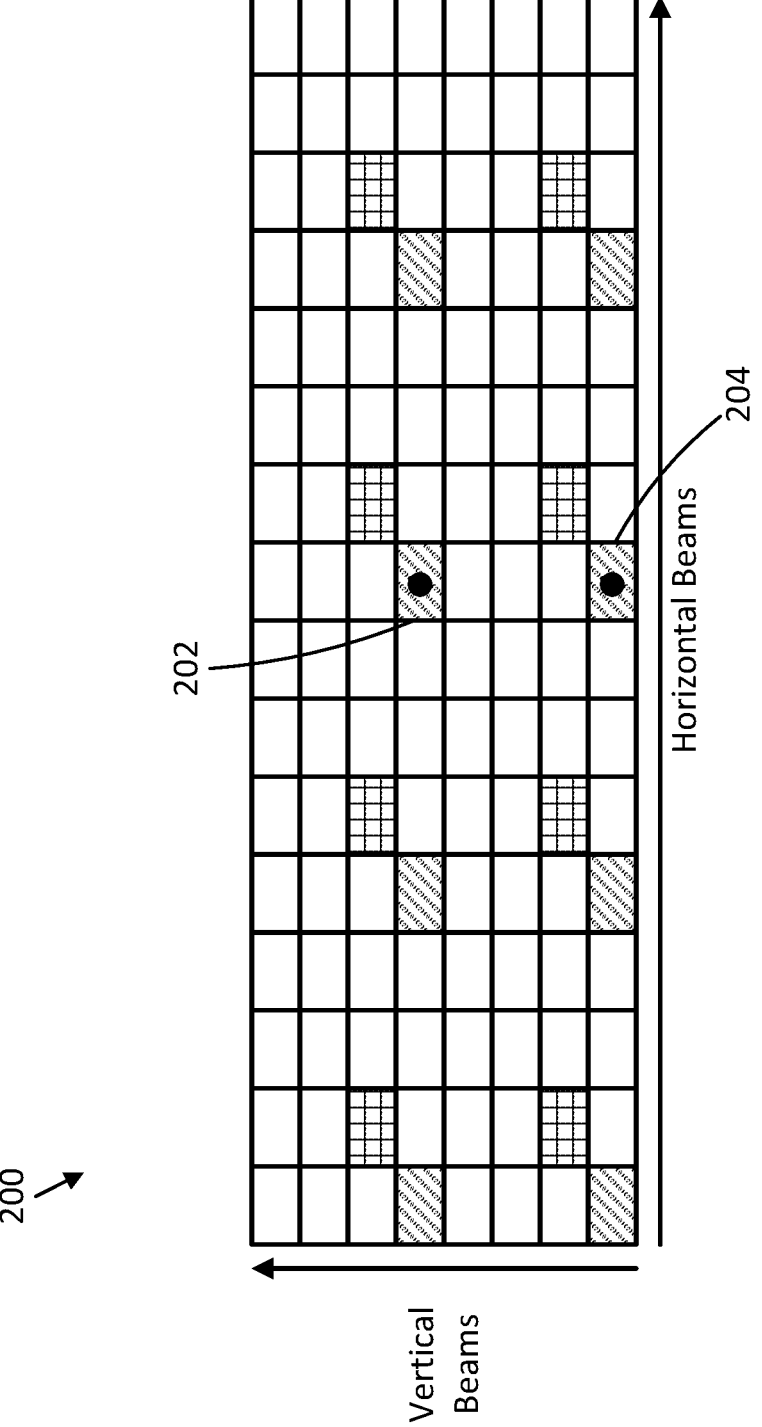
FIG. 2 illustrates an example beam representation of an antenna array in accordance with some embodiments.
Figure 3:
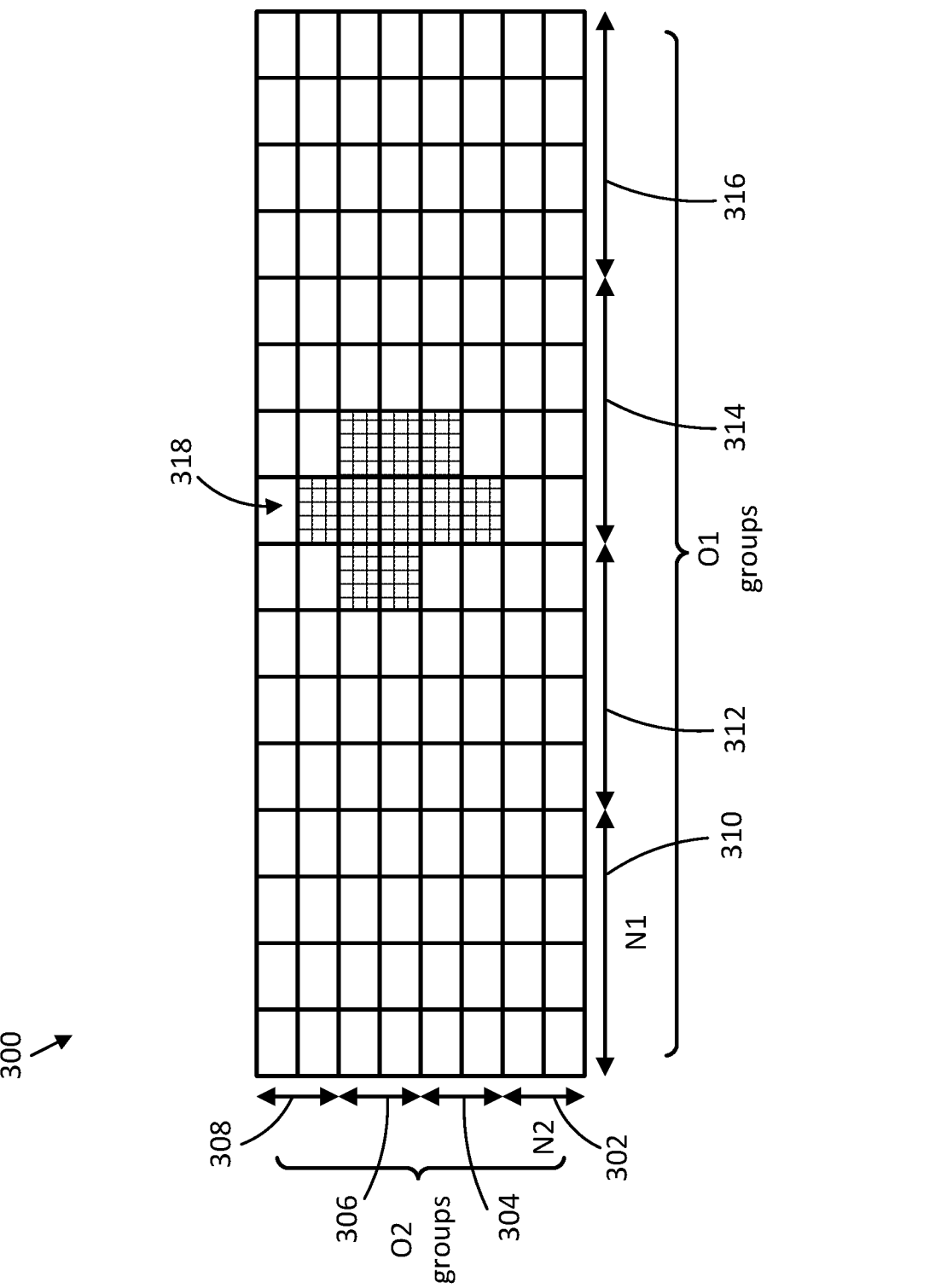
FIG. 3 illustrates another example beam representation of an antenna array in accordance with some embodiments.

Some features related to the design for Type II CSI feedback release 15 (Rel-15) are illustrated by FIG. 2 and FIG. 3.

FIG. 2 illustrates an example beam representation 200 of an antenna array in accordance with some embodiments. For example, the beam representation 200 shows a representation of multiple beams that may be transmitted by an antenna array (which may also be referred to as a transmitter array) of a base station. Each rectangle in the beam representation 200 may represent a beam that can be transmitted by an antenna array. In the illustrated embodiment, the beam representation 200 is shown with vertical beams and horizontal beams orientations. However, it should be understood that the beams within the beam representation 200 can be arranged in a two-dimensional array with the beams extending in two relatively perpendicular direction, and the vertical and horizontal labels do not indicate particular directions of the beam arrangement. At any moment, one or more beams may be transmitted simultaneously by the base station through the antenna array.

For the beam representation 200, a subset from a set of orthogonal beams may be used to construct a codeword. For example, the beams corresponding to the rectangles with crosshatching and diagonal lines may be utilized to construct a codeword. The subset size is denoted by L per polarization, and L can be configured to 2, 3 or 4. The same selected spatial beams may be applied to two polarizations, thus 2×L orthogonal spatial beams may be obtained for the construction of precoders.

If L is configured to 2, in one example, one beam (as marked by dots in the illustrated embodiment) can be selected for constructing the codeword. In particular, a first beam 202 and a second beam 204 are shown as being selected (indicated by the dots) for constructing the codeword in the illustrated embodiment.

For codebook subset restriction, the partition is different and shown in FIG. 3. For example, FIG. 3 illustrates another example beam representation 300 of an antenna array in accordance with some embodiments. Each rectangle in the beam representation 300 may represent a beam that can be transmitted by an antenna array. Each rectangle in the beam representation 200 (FIG. 2) corresponds to corresponding rectangle in the beam representation 300 (FIG. 3), such that the beam represented by a rectangle in a position of the beam representation 200 is the same beam represented by a rectangle in the same position of the beam representation 300.

The crosshatched area ("forbidden beams") can be indicated for beams in 4 beam groups, in a similar way as the information elements (IEs) specified in technical specification (TS) 38.331 (n1-n2-codebookSubsetRestriction) and corresponding procedure in TS 38.214 (e.g., Clause 5.2.2.2.3 for release 16 (Rel-16) Type II codebooks or specifically pages 105-107 of TS 38.214 v.17.3.0). For example, the beams represented by the beam representation 300 may be grouped by O2 groups and O1 groups. In particular, the O2 groups may be indicated by the double arrowed lines shown in the vertical direction, such as a first O2 group 302, a second O2 group 304, a third O2 group 306, and a fourth O2 group. The O1 groups may be indicated by the double arrowed lines shown in the horizontal direction, such as a first O1 group 310, a second O1 group 312, a third O1 group 314, and a fourth O1 group 316. The first O2 group 302 and the first O1 group 310 may define a beam group.

A crosshatched area 318 may indicate forbidden beams. The forbidden beams may be beams are not to be selected for construction of precoders and/or can be selected with procedures to address the selection. The crosshatched area 318 is located in four beam groups in the illustrated. In particular, the crosshatched area 318 is located within a first beam group defined by the fourth O2 group 308 and the third O1 group 314, a second beam group defined by the third O2 group 306 and the second O1 group 312, a third beam group defined by the third O2 group 306 and the third O1 group 314, and a fourth beam group defined by the second O2 group 304 and a third O1 group 314.

The first beam 202 (FIG. 2) may overlap with the crosshatched area 318. Accordingly, the first beam 202 may be a forbidden beam in the illustrated embodiment. Approaches described herein may address how to deal with beams of the subset of beams that can be used to construct a codeword that fall within the forbidden beams.

Figure 4:
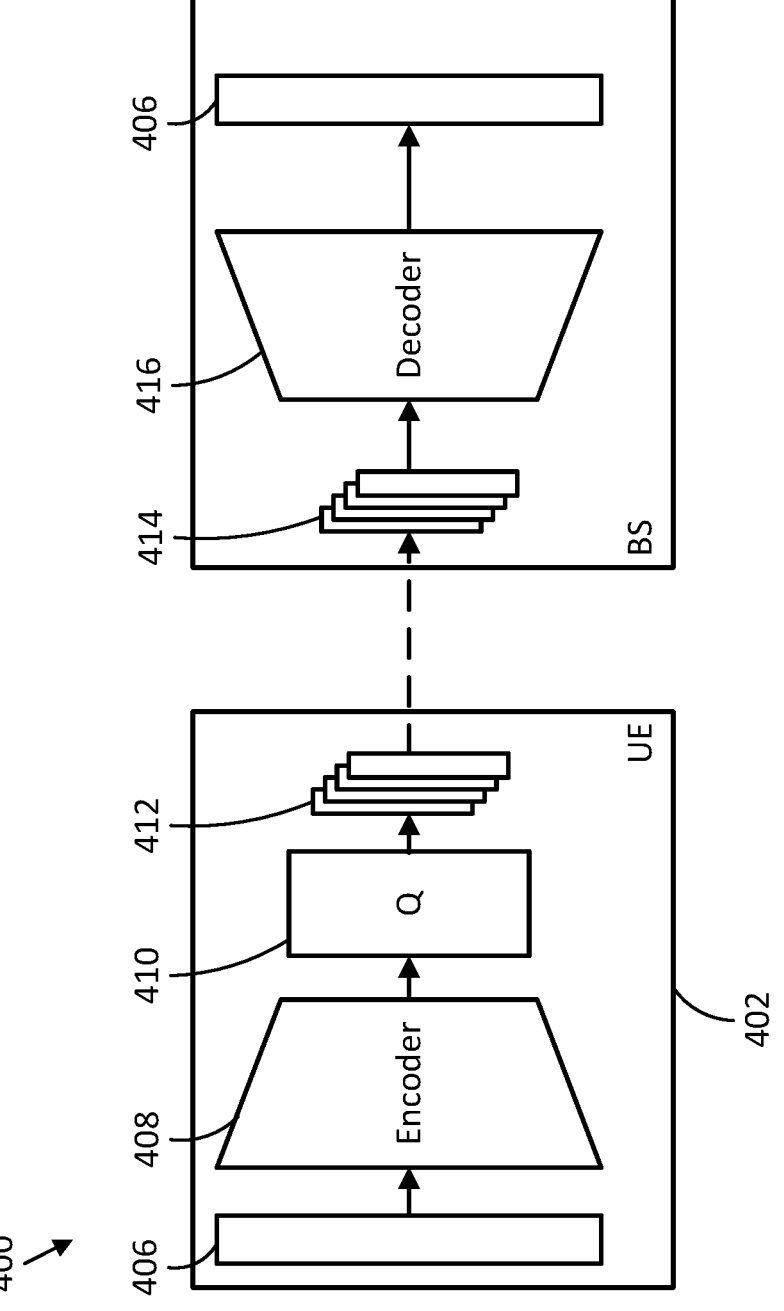
FIG. 4 illustrates an example channel state information (CSI) feedback framework arrangement in accordance with some embodiments.

FIG. 4 illustrates an example CSI feedback framework arrangement 400 in accordance with some embodiments. For example, the CSI feedback framework arrangement 400 may indicate elements for providing and interpreting CSI feedback.

The CSI feedback framework arrangement 400 may include a UE 402. The UE 402 may include one or more of the feature of the UE 106 (FIG. 1) and/or the UE 1200 (FIG. 12). The CSI feedback framework arrangement 400 may further include a base station 404. The base station 404 may include one or more of the features of the first base station 102 (FIG. 1), the second base station 104 (FIG. 1), and/or the gNB 1300 (FIG. 13). The UE 402 may have an established connection with the base station 404 and may be configured to provide CSI feedback to the base station 404. In some embodiments, the CSI feedback may implement an AI based scheme.

The UE 402 may have downlink (DL) CSI 406 to be provided to the base station 404. The UE 402 may include an encoder 408. The encoder 408 may compress the DL CSI. The UE 402 may further include a quantizer 410. The quantizer 410 may quantize the compressed DL CSI output by the encoder to produce data packets 412. The UE 402 may transmit a copy of the data packets 412 to the base station 404.

The base station 404 may receive the copy of the data packets 414 from the UE 402. The base station may include a decoder 416. The decoder 416 may receive the copy of the data packets 414 and generate the DL CSI 406 based on the copy of the data packets 414.

Figure 5:
FIG. 5 illustrates an example signaling chart showing transmission that may be utilized for providing CSI feedback.
Figure 5:
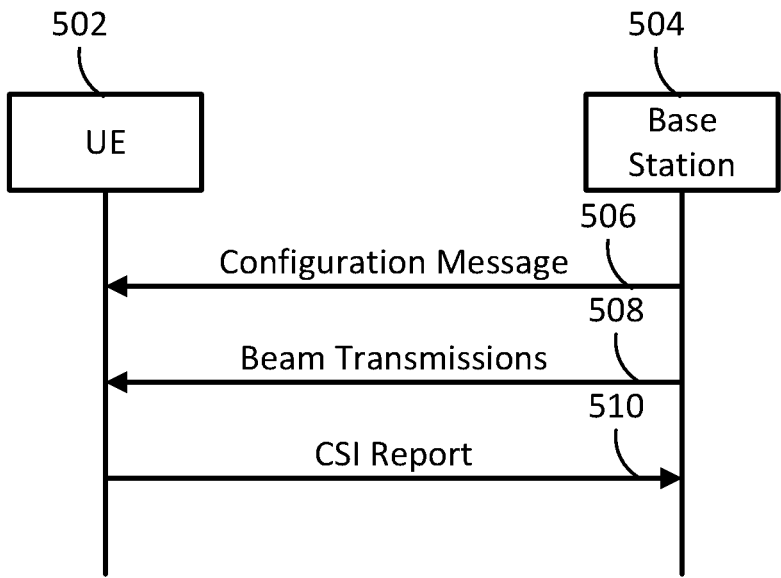

A base station within a network may configure the UE for providing CSI feedback to the base station. FIG. 5 illustrates an example signaling chart 500 showing transmission that may be utilized for providing CSI feedback.

The signaling chart 500 may include a UE 502. The UE 502 may include one or more of the features of the UE 106 (FIG. 1), the UE 402 (FIG. 4), and/or the UE 1200 (FIG. 12). The signaling chart 500 may further include a base station 504. The base station 504 may include one or more of the features of the first base station 102 (FIG. 1), the second base station 104 (FIG. 1), the base station 404 (FIG. 4), and/or the gNB 1300 (FIG. 13). The UE 502 may have an established connection with the base station 504.

The base station 504 may generate and transmit a configuration message 506 to the UE 502. The configuration message 506 may include a CSI feedback configuration and/or configuration information for a CSI feedback configuration. The CSI feedback configuration may be for AI/ML based CSI feedback. The configuration message 506 may include the information described in the approaches throughout, such as the information being provided by a network and/or a base station to configure CSI feedback.

The base station 504 may transmit one or more beam transmissions 508 to the UE 502. The beam transmissions 508 may be from one or more beams, such as the beams represented in the beam representation 200 (FIG. 2) and/or the beam representation 300 (FIG. 3). The beam transmissions 508 may be utilized by the UE 502 to measure a quality of the communications provided by the beams. The UE 502 may generate CSI based on the beam transmissions 508, include channel quality indicators (CQIs).

The UE 502 may generate and transmit a CSI report 510 to the base station 504. The CSI report 510 may include the CSI generated based on the beam transmissions 508. The CSI report 510 may be configured in accordance with the approaches described throughout this disclosure.

In a first approach for AI/machine learning (ML) based CSI feedback, network configures (N1,N2) and (O1,O2) to a UE. For example, a base station may provide values for (N1,N2) and (O1,O2) in a configuration message, such as the configuration message 506 (FIG. 5). In some cases, (O1,O2) may be set to (4,4). Further, in some other cases (O1, O2) may be set to (4,1), or (O1,O2) may be set to (1,1). The UE may feed back the selected q1, q2, 0<=q1<=O1-1, 0<=q2<=O2-1. For example, the UE may feed back the selected q1 and/or q2 in a CSI report, such as the CSI report 510. The value of q1 may be greater than or equal to 0 and less than or equal to O1-1. The value of q2 may be greater than or equal to 0 and less than or equal to O2-1.

In a second approach for AI/ML based CSI feedback, network configures L or L2 to a UE. For example, a base station may provide configuration of L or L2 to a UE via a configuration message, such as the configuration message 506 (FIG. 5). L stands for the number of spatial beams selected for a single polarization, and the same spatial beam selection is conducted for each polarization. L2 stands for the number spatial beams selected for both polarizations, and different spatial beams can be selected at two polarizations.

In a third approach, auto encoder's input is the precoding matrix at size (2×L) by N3 or the precoding matrix at size L2 by N3, where N3 is the number of CSI subbands in the frequency domain for the CSI reporting. In some embodiments, a base station may provide an indication of the precoding matrix size in a configuration message, such as the configuration message 506 (FIG. 5). The indication may indicate that the precoding matrix size is to be (2×L) by N3 or L2 by N3.

Figure 6:
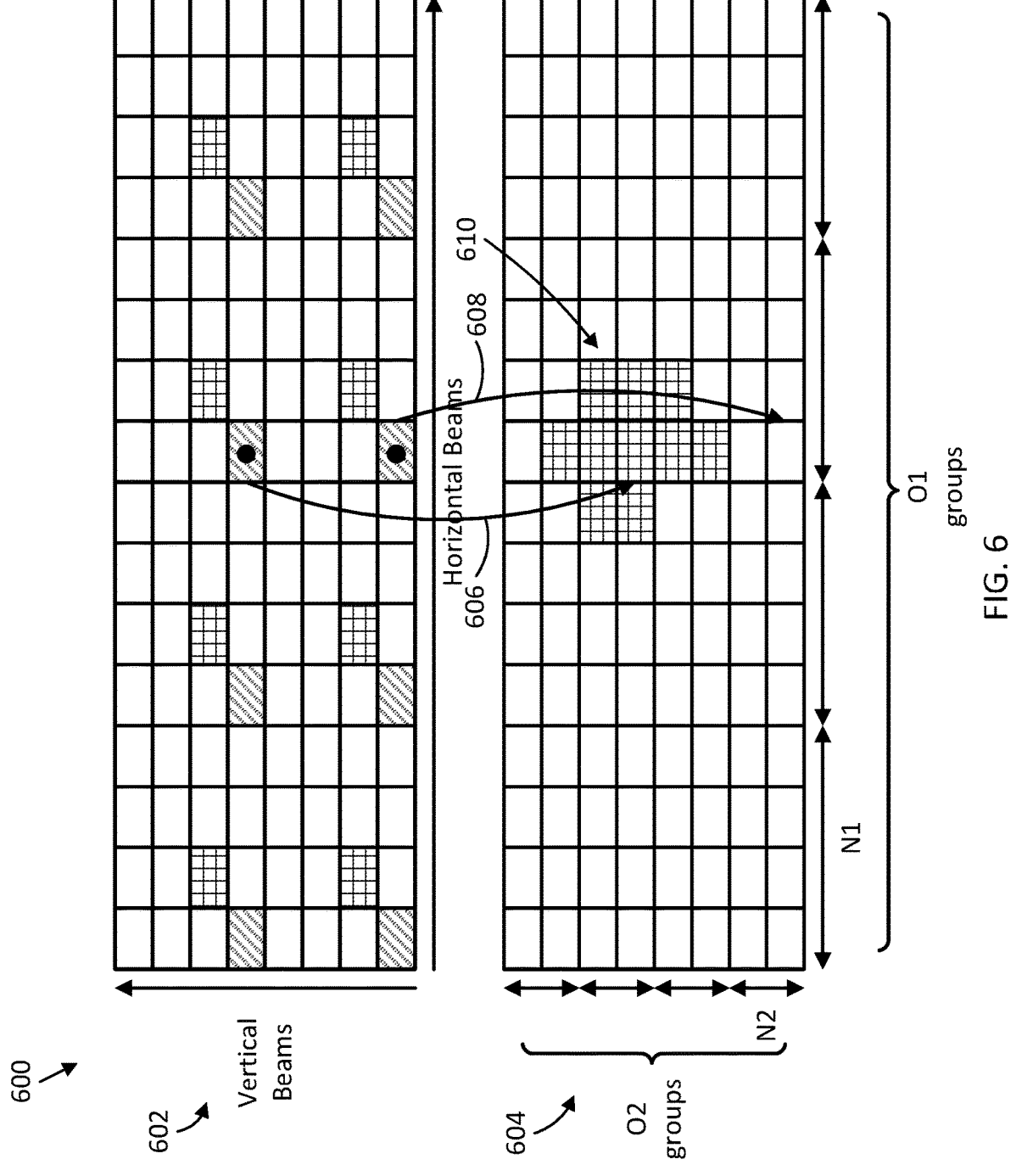
FIG. 6 illustrates example beam representations in accordance with some embodiments.

For codebook subset restriction, with a selected (q1, q2), the selected spatial beams by power are shown by FIG. 6. For example, FIG. 6 illustrates example beam representations 600 in accordance with some embodiments. The beam representations 600 include a first beam representation 602 and a second beam representation 604. The first beam representation 602 includes the features of the beam representation 200 (FIG. 2). The second beam representation 604 includes the features of the beam representation 300 (FIG. 3).

As can be seen, beam 2 is not affected by codebook subset restriction, but beam 1 is. In particular, the beam representations 600 may include a first beam 606 and a second beam 608. As can be seen, the first beam 606 is within the forbidden beams 610 indicated by the crosshatched rectangles. The first beam 606 may be affected by the codebook subset restriction as the first beam 606 is within the forbidden beams. As the second beam 608 does not fall within the forbidden beams 610, the second beam 608 may not be affected by codebook subset restriction.

There can be several treatments (which can also be referred as approaches) for addressing this instance. In treatment 1, the forbidden beam cannot be selected by the UE. In some embodiments, a base station may indicate that the UE cannot select forbidden beams in a configuration message, such as the configuration message 506 (FIG. 5). The UE cannot select a forbidden beam for the precoder in some embodiments.

In treatment 2, the forbidden beam can be selected by the UE. For example, if the spatial beam indexing is designed so, without codebook subset restriction, the indices for selected spatial beams would go like [beam x] [beam 1] [beam y][beam 2], and the change from [beam x] to [beam 2] is gradual. The gradual change may be conducive to compression.

With codebook subset restriction (so [beam 1] is removed), then another beam (beam z) is added then one may have [beam x] [beam z] [beam y][beam 2] or [beam x] [beam y][beam 2] [beam z], they may have more abrupt changes than [beam x] [beam 1] [beam y][beam 2]. For example, the UE may remove beam 1 from the selection and add another beam may be added, such as beam z.

UE may still include [beam 1] in the spatial beam selection, and the UE may freely modify the values for coefficients corresponding to [beam 1] in its auto encoder encoding. Upon decoding at the network side, network will discard the coefficients corresponding to [beam 1]. If the UE computes CQI with the reported PMI, the contribution from [beam 1] is ignored (set to zeros). For example, the UE may set contribution from a forbidden beam to zero in some embodiments. In some embodiments, the base station may ignore the values set for a forbidden beam fed back by UE.

As the feedback is formulated over a matrix over orthogonal beams by N3 rather than {transmission (Tx) ports} by N3, an orthogonal transform is applied to the {Tx ports} by N3 matrix to come up with the desired {orthogonal beams} by N3 representation.

In NR Rel-15, a precoder under a Type II codebook is composed as a linear combination of a number of orthogonal bases. The number of orthogonal bases is given by 2·L, where L is the number of selected orthogonal spatial beams per polarizations, which is a subset of the $N_1 \cdot N_2$ orthogonal spatial beams from the Kronecker product of $N_1$ discrete Fourier transform (DFT) beams with size $N_1 \times 1$ and $N_2$ DFT beams with size $N_2 \times 1$. To aim the 2·L spatial beams well or in another word to fine-tune the spatial beam directions to capture the maximum power, all the $N_1 \cdot N_2$ orthogonal beams at size $N_1 N_2 \times 1$ can be adjusted in the horizontal domain and vertical domain according to parameters $p_1$ and $p_2$, where $0 \le p_1 \le O_1-1$ and $0 \le p_2 \le O_2-1$. $O_1$ and $O_2$ are called the oversampling factors which quantifies the spatial beam direction finetuning steps.

Since Rel-15, codebook subset restriction for Type II codebook has been formulated with the spatial beams. For Type II codebook, the $W_1 W_2$ structure is used and the construction of $W_1$ is given below:

$$W_1 = \begin{bmatrix} b_1 b_2 \ \ldots \ b_L & 0_{N_1 N_2 \times L} \\ 0_{N_1 N_2 \times L} & b_1 b_2 \ \ldots \ b_L \end{bmatrix} = \begin{bmatrix} B & 0_{N_1 N_2 \times L} \\ 0_{N_1 N_2 \times L} & B \end{bmatrix},$$

where $$B = [b_1 b_2 \ \ldots \ b_L].$$

If $L=N_1N_2$, then the orthogonal beam bases from the Kronecker product of DFT beams, $W_1$ is then an $2N_1N_2 \times 2N_1N_2$ unitary matrix. Without codebook subset restriction, P the precoder matrix over $N_3$ subbands is given by a matrix with size $2N_1N_2 \times N_3$ without any restriction.

For codebook subset restriction for AI/ML enabled CSI feedback, in some embodiments, some spatial beams are forbidden. For example, in a similar design as in Rel-15 Type II, a number of groups of beams (e.g., 4 groups) are used to provide the allowed amplitude restriction. In a first scheme, there are F forbidden spatial beams at a polarization. Let S be the selection matrix to select $N_1N_2-F$ spatial beams out of $N_1N_2$ spatial beams, e.g., let $e_1, e_2, \ldots, e_{N_1N_2}$ be the element vectors, if the second spatial beams and the third spatial beams are forbidden beams then $S=[e_1 e_4 \ \ldots \ e_{N_1N_2}]$.

In general, for hard-restriction, by removing $e_j$ if j is an index corresponding to a forbidden spatial beam, then S consists of $e_i$, i does not correspond to a forbidden spatial beam.

A precoder subject to the codebook subset projection can be constructed with the modified $$\tilde{W}_1 = \begin{bmatrix} BS & 0_{N_1 N_2 \times (N_1 N_2 - F)} \\ 0_{N_1 N_2 \times (N_1 N_2 - F)} & BS \end{bmatrix}.$$

Then a projection matrix $$M = \frac{1}{2N_1 N_2} \tilde{W}_1 \tilde{W}_1^H$$

may be used to convert P so the resulted matrix meets the codebook subset restriction requirements, resulting in $$MP = \frac{1}{2N_1 N_2} \tilde{W}_1 \tilde{W}_1^H P.$$

Then the autoencoder is applied to MP insead of P directly when codebook subset restriction is applied. Note that the recovered precoder at the AI/ML decoder on the network side may not have exactly zero coefficients at the forbidden beams, which should be allowed to ease UE implementation.

Figure 7:
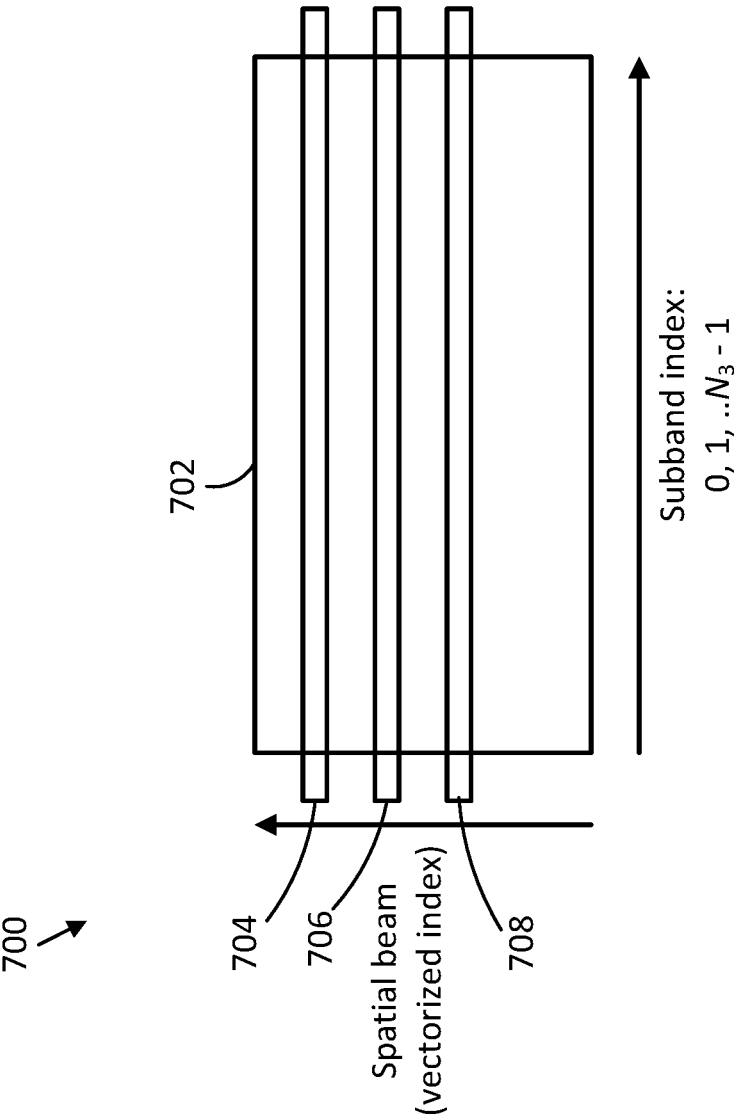
FIG. 7 illustrates an example spatial beam arrangement in accordance with some embodiments.

FIG. 7 illustrates an example spatial beam arrangement 700 in accordance with some embodiments. For example, the spatial beam arrangement 700 may illustrate spatial beams representations of the spatial beams on the y-axis versus the subband indexes on the x-axis.

The spatial beam arrangement 700 illustrates an example of $$\tilde{W}_1^H P,$$

where $$\tilde{W}_1^H$$

can be $2N_1N_2 \times 2N_1N_2$. The spatial beam arrangement 700 includes a rectangle 702 hat can represent the spatial beams organized via vectorized indexes and subband indexes. The spatial beam arrangement 700 further includes a first spatial beam indicator 704, a second spatial beam indicator 706, and a third spatial beam indicator 708. The first spatial beam indicator 704 may indicate a first spatial beam across all the subband indexes, the second spatial beam indicator 706 may indicate a second spatial beam across all the subband indexes, and the third spatial beam indicator 708 may indicate a third spatial beam across all the subband indexes. The spatial beam indicators may be used to indicate the approaches below, as described further.

In an approach 4-1, if the CSI feedback is the channel matrix, soft power codebook subset restriction may not be applied in the feedback (for example, the channel matrix is reported without modification for codebook subset restriction), and the UE reflects the restriction in its CQI calculation. For example, a CQI calculated by the UE based on received spatial beams may reflect a codebook subset restriction.

In an approach 4-2, if the input format to the AI/ML model may be standardized, to avoid excessive specification work, the CSI feedback for AI/ML output from the autoencoder's encoding part may not be modified when codebook subset restriction is configured. For example, the CSI feedback from a precoding matrix indicator (PMI) perspective does not need to be modified when codebook subset restriction is configured.

In an approach 5, for hard-restriction, the encoding part may be applied to $$MP = \frac{1}{2N_1 N_2} \tilde{W}_1 \tilde{W}_1^H P,$$

where $$\tilde{W}_1 = \begin{bmatrix} BS & 0_{N_1 N_2 \times (N_1 N_2 - F)} \\ 0_{N_1 N_2 \times (N_1 N_2 - F)} & BS \end{bmatrix}.$$

The following approaches can be implemented for soft power codebook subset restriction with AI/ML enabled CSI.

In an approach 6, the precoder may constrained to meet the condition of summation of the power of precoding matrix over a forbidden/restricted spatial beam/{maximum of summation of the power precoding matrix over a non-forbidden spatial beam} meets the power profile requirement, e.g., 0, 0.5, 0.25, etc. For example, a base station may configure a UE via a configuration message (such as the configuration message 506 (FIG. 5) to have a ratio of a summation of a power of precoding matrix over a forbidden spatial to a maximum of summation of the power of precoding matrix over a non-forbidden spatial beam meet a defined power profile requirement. For example, if a first spatial beam corresponding to the first spatial beam indicator 704 is a forbidden spatial beam and a second spatial beam corresponding to the second spatial beam indicator 706 is a non-forbidden spatial beam presenting a maximum power, the power ratio of the first spatial beam to second spatial beam may be less than or equal to the value provided for the power profile requirement.

In an approach 6A, the precoder may be constrained to meet the condition of summation of the power of precoding matrix over a forbidden/restricted spatial beam/{average of summation of the power precoding matrix over a non-forbidden spatial beam} meets the power profile requirement, e.g., 0, 0.5, 0.25, etc. For example, a base station may configure a UE via a configuration message (such as the configuration message 506 (FIG. 5) to have a ratio of a summation of a power of precoding matrix over a forbidden spatial to an average of summation of the power of precoding matrix over a non-forbidden spatial beam meet a defined power profile requirement. For example, if a first spatial beam corresponding to the first spatial beam indicator 704 is a forbidden spatial beam, and a second spatial beam corresponding to the second spatial beam indicator 706 and a third spatial beam corresponding to the third spatial beam indicator are non-forbidden spatial beams, the power ratio of the first spatial beam to averaged power of the second spatial beam and the third spatial beam may be less than or equal to the value provided for the power profile requirement.

Figure 8:
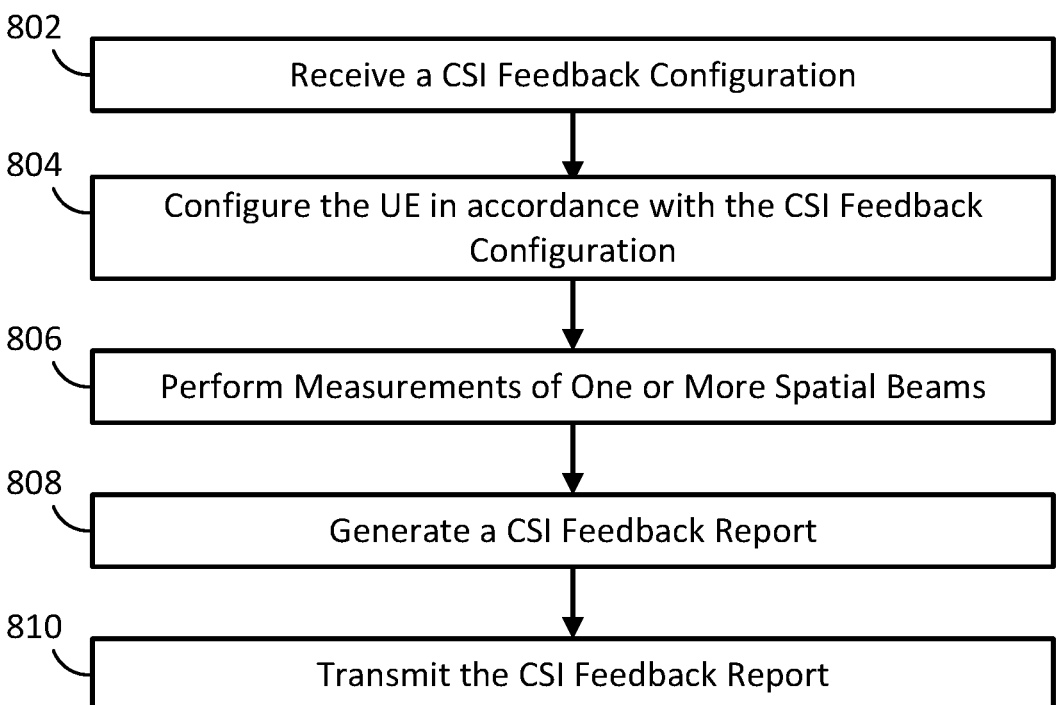
FIG. 8 illustrates an example procedure for operating a user equipment (UE) in accordance with some embodiments.

FIG. 8 illustrates an example procedure 800 for operating a UE in accordance with some embodiments. For example, the procedure 800 may be performed by a UE, such as the UE 106 (FIG. 1), the UE 402 (FIG. 4), the UE 502 (FIG. 5), and/or the UE 1200 (FIG. 12).

The procedure 800 may include receiving a CSI feedback configuration in 802. For example, the UE may receive, from a base station, a CSI feedback configuration for AI/ML based CSI feedback.

In some embodiments, the CSI feedback configuration may include an indication of a number of transceivers in a horizontal direction in an antenna array corresponding to the base station, a number of transceivers in a vertical direction in the antenna array, a first oversampling factor for the horizontal direction, and a second oversampling factor for the vertical direction. In some of these embodiments, the first oversampling factor may be equal to four and the second oversampling factor may be equal to four. Further, the first oversampling factor may be equal to four and the second oversampling factor may be equal to one in some of these embodiments. In some of these embodiments, the first oversampling factor may be equal to one and the second oversampling factor may be equal to one.

In some embodiments, the CSI feedback configuration may include an indication of spatial beams selected for a CSI feedback report for a first polarization. Further, the CSI feedback configuration may include an indication of first spatial beams selected for the CSI feedback report for a first polarization and an indication of second spatial beams selected for the CSI feedback report for a second polarization in some embodiments.

In some embodiments, the CSI feedback configuration may include an indication of a size of precoding matrix for a CSI feedback report. In some of these embodiments, the size of precoding matrix may be indicated as (2×L) by N3, where L comprises a number of spatial beams selected for a single polarization and N3 comprises a number of CSI subbands in a frequency domain for the CSI feedback report. Further, the size of precoding matrix may be indicated as L2 by N3 in some of these embodiments, where L2 comprises a number of spatial beams selected for a first polarization and a second polarization, and where N3 comprises a number of CSI subbands in a frequency domain for the CSI feedback report.

In some embodiments, the CSI feedback configuration may include an indication of one or more forbidden beams that cannot be selected by the UE for the CSI feedback report. Further, the CSI feedback configuration may include an indication of one or more forbidden beams in some embodiments.

The procedure 800 may include configuring the UE in accordance with the CSI feedback configuration in 804. For example, the UE may configure the UE in accordance with the CSI feedback configuration.

In some embodiments, configuring the UE in accordance with the CSI feedback configuration may comprise configuring the UE based on the number of transceivers in the horizontal direction, the number of transceivers in the vertical direction, the first oversampling factor, and the second oversampling factor, which may be included in the CSI feedback configuration.

In some embodiments, configuring the UE in accordance with the CSI feedback configuration may comprise configuring the UE to utilize the spatial beams for the first polarization and a second polarization, where the CSI feedback configuration may indicate the spatial beams for the first polarization. Further, configuring the UE in accordance with the CSI feedback configuration may comprise configuring the UE to utilize the first spatial beams for the first polarization and to utilize the second spatial beams for the second polarization in some embodiments, where the CSI feedback configuration may indicate the first spatial beams for the first polarization and the second spatial beams for the second polarization.

In some embodiments, configuring the UE in accordance with the CSI feedback configuration may comprise generating a precoding matrix of the indicated size of precoding matrix, where the size of precoding matrix may be indicated in the CSI feedback configuration.

In some embodiments, configuring the UE in accordance with the CSI feedback configuration may comprise configuring the UE to utilize one or more spatial beams that do not include the one or more forbidden beams for the CSI feedback report. Further, configuring the UE in accordance with the CSI feedback configuration may comprise configuring the UE to set CSI feedback values for the one or more forbidden beams based on portions of the CSI feedback report adjacent to the one or more forbidden beams in some embodiments.

In some embodiments, configuring the UE in accordance with the CSI feedback configuration may comprise configuring the UE to reflect a subset codebook restriction in a CQI of the CSI feedback report.

In some embodiments, configuring the UE in accordance with the CSI feedback configuration may comprise configuring the UE to utilize a precoder implementing a matrix of $$MP = \frac{1}{2N_1 N_2} \tilde{W}_1 \tilde{W}_1^H P,$$

where $$\tilde{W}_1 = \begin{bmatrix} BS & 0_{N_1 N_2 \times (N_1 N_2 - F)} \\ 0_{N_1 N_2 \times (N_1 N_2 - F)} & BS \end{bmatrix},$$

where $N_1$ comprises a number of rows of transceivers in an antenna array, where $N_2$ comprises a number of columns of the transceivers in an antenna array, where B comprises spatial beam indexes, where F comprises a number of forbidden beams at a polarization, where P comprises a precoder matrix of $2N_1 N_2 \times N_3$, where $N_3$ comprise a number of subbands, and where S comprises an indication of element vectors for the CSI feedback report.

In some embodiments, configuring the UE in accordance with the CSI feedback configuration may comprise configuring the UE to utilize a precoder implementing a matrix of $$MRM^H = \frac{1}{2N_1 N_2} \tilde{W}_1 \tilde{W}_1^H R \left( \tilde{W}_1 \tilde{W}_1^H \right)^H,$$

where $$\tilde{W}_1 = \begin{bmatrix} BS & 0_{N_1 N_2 \times (N_1 N_2 - F)} \\ 0_{N_1 N_2 \times (N_1 N_2 - F)} & BS \end{bmatrix},$$

where $N_1$ comprises a number of rows of transceivers in an antenna array, where $N_2$ comprises a number of columns of the transceivers in an antenna array, where B comprises spatial beam indexes, where F comprises a number of forbidden beams at a polarization, where R comprises a subband covariance matrix, and where S comprises an indication of element vectors for the CSI feedback report.

In some embodiments, configuring the UE in accordance with the CSI feedback configuration may comprise configuring the UE to utilize a precoder implementing a matrix of $$MRM^H = \frac{1}{2N_1 N_2} \tilde{W}_1 \tilde{W}_1^H R \left( \tilde{W}_J \tilde{W}_1^H \right)^H,$$

where $$\tilde{W}_1 = \begin{bmatrix} BS & 0_{N_1 N_2 \times (N_1 N_2 - F)} \\ 0_{N_1 N_2 \times (N_1 N_2 - F)} & BS \end{bmatrix},$$

where $N_1$ comprises a number of rows of transceivers in an antenna array, where $N_2$ comprises a number of columns of the transceivers in an antenna array, where B comprises spatial beam indexes, where F comprises a number of forbidden beams at a polarization, where R comprises a wideband matrix, and where S comprises an indication of element vectors for the CSI feedback report.

In some embodiments, configuring the UE in accordance with the CSI feedback configuration may comprise configuring the UE to have a ratio of a summation of a power of precoding matrix over a forbidden spatial beam to a maximum of summation of the power of precoding matrix over a non-forbidden spatial beam meet a defined power profile requirement. In some of these embodiments, the power profile requirement may comprise the ratio having a value of less than 0.5 or 0.25. Further, the power profile requirement may comprise the ratio having a value of 0 in some of these embodiments.

In some embodiments, configuring the UE in accordance with the CSI feedback configuration may comprise configuring the UE to have a ratio of a summation of a power of precoding matrix over a forbidden spatial beam to an average of summation of the power of precoding matrix over a non-forbidden spatial beam meet a defined power profile requirement. In some of these embodiments, the power profile requirement may comprise the ratio having a value of less than 0.5 or 0.25. Further, the power profile requirement may comprise the ratio having a value of 0 in some of these embodiments.

The procedure 800 may include performing measurements of one or more spatial beams in 806. For example, the UE may perform measurements of one or more spatial beams received by the UE.

The procedure 800 may include generating a CSI feedback report in 808. For example, the UE may generate a CSI feedback report, the CSI feedback report being generated in accordance with the CSI feedback configuration.

The procedure 800 may include transmitting the CSI feedback report in 810. For example, the UE may transmit the CSI feedback report to the base station.

While FIG. 8 may arguably imply an order of the procedure 800, it should be understood that one or more of the operations of the procedure 800 may be performed in a different order and/or one or more of the operations of the procedure 800 may be performed concurrently in embodiments. Further, it should be understood that one or more of the operations of the procedure 800 may be omitted and/or one or more additional operations may be added to the procedure 800 in other embodiments.

Figure 9:
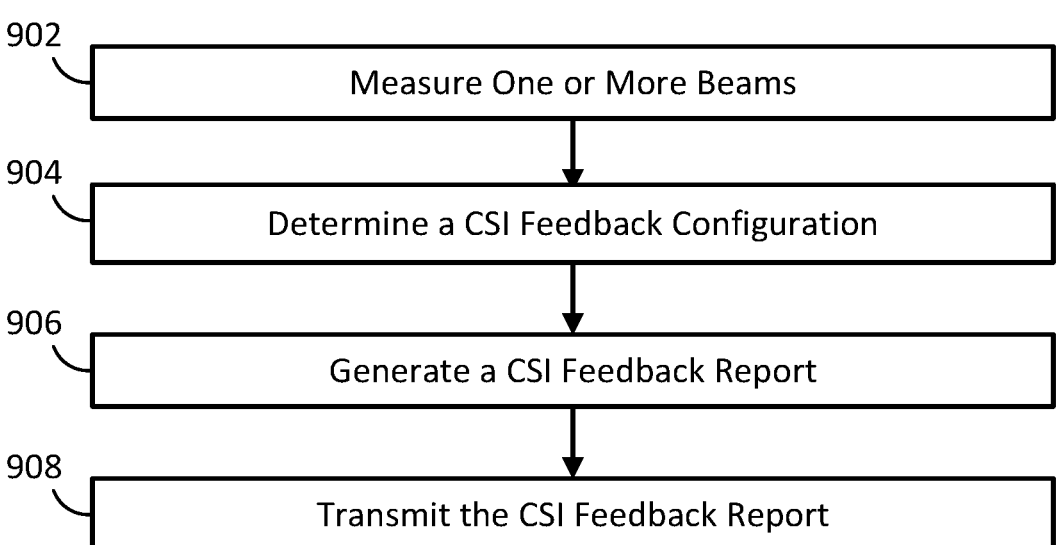
FIG. 9 illustrates an example procedure for operating a UE in accordance with some embodiments.

FIG. 9 illustrates an example procedure 900 for operating a UE in accordance with some embodiments. For example, the procedure 900 may be performed by a UE, such as the UE 106 (FIG. 1), the UE 402 (FIG. 4), the UE 502 (FIG. 5), and/or the UE 1200 (FIG. 12).

The procedure 900 may include measuring one or more beams in 902. For example, the UE may measure one or more beams received by the UE to produce CSI.

The procedure 900 may include determining a CSI feedback configuration in 904. For example, the UE may determine a CSI feedback configuration for AI/ML based CSI feedback. In some embodiments, the procedure 900 may further include receiving, from the base station, configuration information for the CSI feedback configuration and/or configuring the UE based on the configuration information. For example, the UE may receive, from the base station, configuration information for the CSI feedback configuration in some embodiments. Further, the UE may configure the UE based on the configuration information in some embodiments.

In some embodiments, the configuration information may include an indication of a number of transceivers in a horizontal direction in an antenna array corresponding to the base station, a number of transceivers in a vertical direction in the antenna array, a first oversampling factor for the horizontal direction, and a second oversampling factor for the vertical direction. In some of these embodiments, the first oversampling factor may be equal to four and the second oversampling factor may be equal to four. Further, the first oversampling factor may be equal to four and the second oversampling factor may be equal to one in some of these embodiments. In some of these embodiments, the first oversampling factor may be equal to one and the second oversampling factor may be equal to one.

In some embodiments, the configuration information may include an indication of spatial beams selected for the CSI feedback report for a first polarization. In some of these embodiments, configuring the UE based on the configuration information may comprise configuring the UE to utilize the spatial beams for the first polarization and a second polarization.

In some embodiments, the configuration information may include an indication of first spatial beams selected for the CSI feedback report for a first polarization and an indication of second spatial beams selected for the CSI feedback report for a second polarization. In some of these embodiments, configuring the UE based on the configuration information may comprise configuring the UE to utilize the first spatial beams for the first polarization and to utilize the second spatial beams for the second polarization.

In some embodiments, the configuration information may include an indication of a size of precoding matrix for the CSI feedback report. In some of these embodiments, configuring the UE based on the configuration information may comprise generating a precoding matrix of the indicated size of precoding matrix. Further, the size of precoding matrix may be indicated as (2×L) by N3, and wherein L comprises a number of spatial beams selected for a single polarization and N3 comprises a number of CSI subbands in a frequency domain for the CSI feedback report in some of these embodiments. In some of these embodiments, the size of precoding matrix may be indicated as L2 by N3, wherein L2 comprises a number of spatial beams selected for a first polarization and a second polarization, and wherein N3 comprises a number of CSI subbands in a frequency domain for the CSI feedback report.

In some embodiments, the configuration information may include an indication of one or more forbidden beams that cannot be selected by the UE for the CSI feedback report. In some of these embodiments, configuring the UE based on the configuration information may comprise configuring the UE to utilize one or more spatial beams that do not include the one or more forbidden beams for the CSI feedback report.

In some embodiments, the configuration information may include an indication of one or more forbidden beams. In some of these embodiments, configuring the UE based on the configuration information may comprise configuring the UE to set CSI feedback values for the one or more forbidden beams based on portions of the CSI feedback report adjacent to the one or more forbidden beams.

The procedure 900 may include generating a CSI feedback report in 906. For example, the UE may generate a CSI feedback report to indicate the CSI for the one or more beams, the CSI feedback report generated in accordance with the CSI feedback configuration.

In some embodiments, generating the CSI feedback report may comprise generating a channel quality indicator (CQI) of the CSI feedback report to reflect a subset codebook restriction.

In some embodiments, generating the CSI feedback report may comprise utilizing a precoder implementing a matrix of $$MP = \frac{1}{2N_1 N_2} \tilde{W}_1 \tilde{W}_1^H P,$$

where $$\tilde{W}_1 = \begin{bmatrix} BS & 0_{N_1 N_2 \times (N_1 N_2 - F)} \\ 0_{N_1 N_2 \times (N_1 N_2 - F)} & BS \end{bmatrix},$$

where $N_1$ comprises a number of rows of transceivers in an antenna array, where $N_2$ comprises a number of columns of the transceivers in an antenna array, where B comprises spatial beam indexes, where F comprises a number of forbidden beams at a polarization, where P comprises a precoder matrix of $2N_1 N_2 \times N_3$, where $N_3$ comprise a number of subbands, and where S comprises an indication of element vectors for the CSI feedback report.

In some embodiments, generating the CSI feedback report may comprise utilizing a precoder implementing a matrix of $$MR = \frac{1}{2N_1 N_2} \tilde{W}_1 \tilde{W}_1^H R,$$

where $$\tilde{W}_1 = \begin{bmatrix} BS & 0_{N_1 N_2 \times (N_1 N_2 - F)} \\ 0_{N_1 N_2 \times (N_1 N_2 - F)} & BS \end{bmatrix},$$

where $N_1$ comprises a number of rows of transceivers in an antenna array, where $N_2$ comprises a number of columns of the transceivers in an antenna array, where B comprises spatial beam indexes, where F comprises a number of forbidden beams at a polarization, where R comprises a subband covariance matrix, and where S comprises an indication of element vectors for the CSI feedback report.

In some embodiments, generating the CSI feedback report may comprise utilizing a precoder implementing a matrix of $$MR = \frac{1}{2N_1 N_2} \tilde{W}_1 \tilde{W}_1^H R,$$

where $$\tilde{W}_1 = \begin{bmatrix} BS & 0_{N_1 N_2 \times (N_1 N_2 - F)} \\ 0_{N_1 N_2 \times (N_1 N_2 - F)} & BS \end{bmatrix},$$

where $N_1$ comprises a number of rows of transceivers in an antenna array, where $N_2$ comprises a number of columns of the transceivers in an antenna array, where B comprises spatial beam indexes, where F comprises a number of forbidden beams at a polarization, where R comprises a wideband matrix, and where S comprises an indication of element vectors for the CSI feedback report.

In some embodiments, generating the CSI feedback report may include generating the CSI feedback report to have a ratio of a summation of a power of precoding matrix over a forbidden spatial beam to a maximum of summation of the power of precoding matrix over a non-forbidden spatial beam meet a defined power profile requirement. In some of these embodiments, the power profile requirement may comprise the ratio having a value of less than 0.5 or 0.25. Further, the power profile requirement may comprise the ratio having a value of 0 in some of these embodiments.

In some embodiments, generating the CSI feedback report may include generating the CSI feedback report to have a ratio of a summation of a power of precoding matrix over a forbidden spatial beam to an average of summation of the power of precoding matrix over a non-forbidden spatial beam meet a defined power profile requirement. In some of these embodiments, the power profile requirement may comprise the ratio having a value of less than 0.5 or 0.25. Further, the power profile requirement comprises the ratio having a value of 0 in some of these embodiments.

The procedure 900 may include transmitting the CSI feedback report in 908. For example, the UE may transmit the CSI feedback report to a base station.

While FIG. 9 may arguably imply an order of the procedure 900, it should be understood that one or more of the operations of the procedure 900 may be performed in a different order and/or one or more of the operations of the procedure 900 may be performed concurrently in embodiments. Further, it should be understood that one or more of the operations of the procedure 900 may be omitted and/or one or more additional operations may be added to the procedure 900 in other embodiments.

Figure 10:
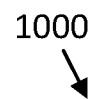
FIG. 10 illustrates an example procedure for operating a base station in accordance with some embodiments.
Figure 10:
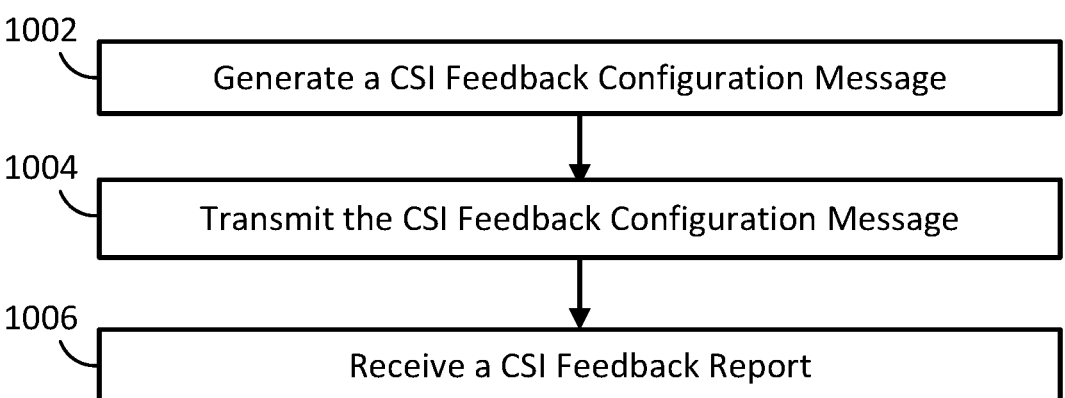

FIG. 10 illustrates an example procedure 1000 for operating a base station in accordance with some embodiments. For example, the procedure 1000 may be performed by a base station, such as the first base station 102 (FIG. 1), the second base station 104 (FIG. 1), the base station 404 (FIG. 4), the base station 504 (FIG. 5), and/or the gNB 1300 (FIG. 13).

The procedure 1000 may include generating a CSI feedback configuration message in 1002. For example, the base station may generate a channel state information (CSI) feedback configuration message, the CSI feedback configuration message providing a CSI feedback configuration for artificial intelligence (AI)/machine learning (ML) based CSI feedback.

In some embodiments, the CSI feedback configuration message may include an indication of a number of transceivers in a horizontal direction in an antenna array corresponding to the base station, a number of transceivers in a vertical direction in the antenna array, a first oversampling factor for the horizontal direction, and a second oversampling factor for the vertical direction. In some of these embodiments, the first oversampling factor may be equal to four and the second oversampling factor may be equal to four. Further, the first oversampling factor may be equal to four and the second oversampling factor may be equal to one in some of these embodiments. In some of these embodiments, the first oversampling factor may be equal to one and the second oversampling factor may be equal to one.

In some embodiments, the CSI feedback configuration may include an indication of spatial beams selected for the CSI feedback report for a first polarization, the UE to be configured to utilize the spatial beams for the first polarization and a second polarization. Further, the CSI feedback configuration may include an indication of first spatial beams selected for the CSI feedback report for a first polarization and an indication of second spatial beams selected for the CSI feedback report for a second polarization, the UE to be configured to utilize the first spatial beams for the CSI feedback report for the first polarization and to utilize the second spatial beams for the CSI feedback report for the second polarization in some of these embodiments.

In some embodiments, the CSI feedback configuration may include an indication of a size of precoding matrix for the CSI feedback report, the UE to generate a precoding matrix of the size of precoding matrix. In some of these embodiments, the size of precoding matrix may be indicated as (2×L) by N3, and wherein L comprises a number of spatial beams selected for a single polarization and N3 comprises a number of CSI subbands in a frequency domain for the CSI feedback report. Further, the size of precoding matrix may be indicated as L2 by N3, wherein L2 comprises a number of spatial beams selected for a first polarization and a second polarization, and wherein N3 comprises a number of CSI subbands in a frequency domain for the CSI feedback report in some of these embodiments.

In some embodiments, the CSI feedback configuration may include an indication of one or more forbidden beams that cannot be selected by the UE for the CSI feedback report. Further, the CSI feedback configuration may include an indication of one or more forbidden beams, the UE to set CSI feedback values for the one or more forbidden beams based on portions of the CSI feedback report adjacent to the one or more forbidden beams in some embodiments.

In some embodiments, the CSI feedback configuration may include an indication of a precoder implementing a matrix of $$ MP = \frac{1}{2N_1 N_2} \tilde{W}_1 \tilde{W}_1^H P, \text{ where } \tilde{W}_1 = \begin{bmatrix} BS & 0_{N_1 N_2 \times (N_1 N_2 - F)} \\ 0_{N_1 N_2 \times (N_1 N_2 - F)} & BS \end{bmatrix}, $$

where $N_1$ comprises a number of rows of transceivers in an antenna array, where $N_2$ comprises a number of columns of the transceivers in an antenna array, where B comprises spatial beam indexes, where F comprises a number of forbidden beams at a polarization, where P comprises a precoder matrix of $2N_1 N_2 \times N_3$, where $N_3$ comprise a number of subbands, and where S comprises an indication of element vectors for the CSI feedback report.

In some embodiments, the CSI feedback configuration may include an indication of a precoder implementing a matrix of $$ MR = \frac{1}{2N_1 N_2} \tilde{W}_1 \tilde{W}_1^H R, \text{ where } \tilde{W}_1 = \begin{bmatrix} BS & 0_{N_1 N_2 \times (N_1 N_2 - F)} \\ 0_{N_1 N_2 \times (N_1 N_2 - F)} & BS \end{bmatrix}, $$

where $N_1$ comprises a number of rows of transceivers in an antenna array, where $N_2$ comprises a number of columns of the transceivers in an antenna array, where B comprises spatial beam indexes, where F comprises a number of forbidden beams at a polarization, where R comprises a subband covariance matrix, and where S comprises an indication of element vectors for the CSI feedback report.

In some embodiments, the CSI feedback configuration may include an indication of a precoder implementing a matrix of $$ MR = \frac{1}{2N_1 N_2} \tilde{W}_1 \tilde{W}_1^H R, \text{ where } \tilde{W}_1 = \begin{bmatrix} BS & 0_{N_1 N_2 \times (N_1 N_2 - F)} \\ 0_{N_1 N_2 \times (N_1 N_2 - F)} & BS \end{bmatrix}, $$

where $N_1$ comprises a number of rows of transceivers in an antenna array, where $N_2$ comprises a number of columns of the transceivers in an antenna array, where B comprises spatial beam indexes, where F comprises a number of forbidden beams at a polarization, where R comprises a wideband matrix, and where S comprises an indication of element vectors for the CSI feedback report.

In some embodiments, the CSI feedback configuration may indicate that the CSI feedback report is to have a ratio of a summation of a power of precoding matrix over a forbidden spatial beam to a maximum of summation of the power of precoding matrix over a non-forbidden spatial beam meet a defined power profile requirement. In some of these embodiments, the power profile requirement may comprise the ratio having a value of less than 0.5 or 0.25. Further, the power profile requirement may comprise the ratio having a value of 0 in some of these embodiments.

In some embodiments, the CSI feedback configuration may indicate that the CSI feedback report is to have a ratio of a summation of a power of precoding matrix over a forbidden spatial beam to an average of summation of the power of precoding matrix over a non-forbidden spatial beam meet a defined power profile requirement. In some of these embodiments, the power profile requirement may comprise the ratio having a value of less than 0.5 or 0.25.

Further, the power profile requirement may comprise the ratio having a value of 0 in some of these embodiments.

The procedure 1000 may include transmitting the CSI feedback configuration message in 1004. For example, the base station may transmit, to a UE, the CSI feedback configuration message. In some embodiments, the procedure 1000 may further include transmitting, to the UE, one or more spatial beams for CSI measurement by the UE, wherein the CSI feedback report is related to the one or more spatial beams. For example, the base station may transmit, to the UE, one or more spatial beams for CSI measurement by the UE, wherein the CSI feedback report is related to the one or more spatial beams.

The procedure 1000 may include receiving a CSI feedback report in 1006. For example, the base station may receive, from the UE, a CSI feedback report, the CSI feedback report in accordance with the CSI feedback configuration. In some embodiments, the procedure 1000 may further include identifying CSI corresponding to forbidden beams in the CSI feedback report and/or disregarding the CSI corresponding to the forbidden beams. For example, the base station may identify CSI corresponding to forbidden beams in the CSI feedback report in some embodiments. Further, the base station may disregard the CSI corresponding to the forbidden beams in some embodiments.

Figure 11:
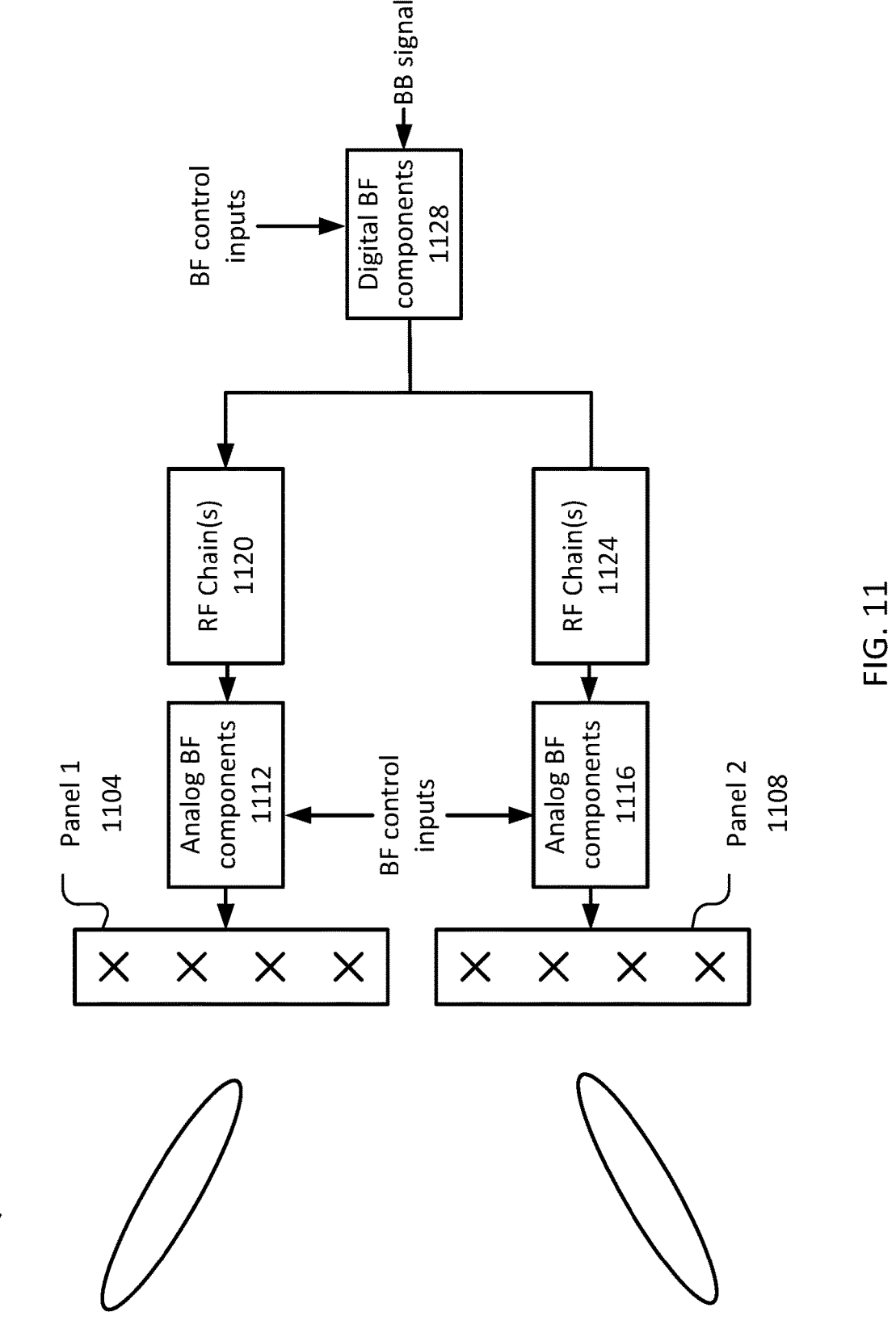
FIG. 11 illustrates example beamforming circuitry in accordance with some embodiments.

FIG. 11 illustrates example beamforming circuitry 1100 in accordance with some embodiments. The beamforming circuitry 1100 may include a first antenna panel, panel 1 1104, and a second antenna panel, panel 2 1108. Each antenna panel may include a number of antenna elements. Other embodiments may include other numbers of antenna panels.

Digital beamforming (BF) components 1128 may receive an input baseband (BB) signal from, for example, a baseband processor such as, for example, baseband processor 1204A of FIG. 12. The digital BF components 1128 may rely on complex weights to pre-code the BB signal and provide a beamformed BB signal to parallel radio frequency (RF) chains 1120/1124.

Each RF chain 1120/1124 may include a digital-to-analog converter to convert the BB signal into the analog domain; a mixer to mix the baseband signal to an RF signal; and a power amplifier to amplify the RF signal for transmission.

The RF signal may be provided to analog BF components 1112/1116, which may apply additionally beamforming by providing phase shifts in the analog domain. The RF signals may then be provided to antenna panels 1104/1108 for transmission.

In some embodiments, instead of the hybrid beamforming shown here, the beamforming may be done solely in the digital domain or solely in the analog domain.

In various embodiments, control circuitry, which may reside in a baseband processor, may provide BF weights to the analog/digital BF components to provide a transmit beam at respective antenna panels. These BF weights may be determined by the control circuitry to provide the directional provisioning of the serving cells as described herein. In some embodiments, the BF components and antenna panels may operate together to provide a dynamic phased-array that is capable of directing the beams in the desired direction.

FIG. 12 illustrates an example UE 1200 in accordance with some embodiments. The UE 1200 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices. In some embodiments, the UE 1200 may be a RedCap UE or NR-Light UE.

The UE 1200 may include processors 1204, RF interface circuitry 1208, memory/storage 1212, user interface 1216, sensors 1220, driver circuitry 1222, power management integrated circuit (PMIC) 1224, antenna structure 1226, and battery 1228. The components of the UE 1200 may be implemented as integrated circuits (ICs), portions thereof, discrete electronic devices, or other modules, logic, hardware, software, firmware, or a combination thereof. The block diagram of FIG. 12 is intended to show a high-level view of some of the components of the UE 1200. However, some of the components shown may be omitted, additional components may be present, and different arrangement of the components shown may occur in other implementations.

The components of the UE 1200 may be coupled with various other components over one or more interconnects 1232, which may represent any type of interface, input/output, bus (local, system, or expansion), transmission line, trace, optical connection, etc. that allows various circuit components (on common or different chips or chipsets) to interact with one another.

The processors 1204 may include processor circuitry such as, for example, baseband processor circuitry (BB) 1204A, central processor unit circuitry (CPU) 1204B, and graphics processor unit circuitry (GPU) 1204C. The processors 1204 may include any type of circuitry or processor circuitry that executes or otherwise operates computer-executable instructions, such as program code, software modules, or functional processes from memory/storage 1212 to cause the UE 1200 to perform operations as described herein. For example, the processors 1204 may include interface circuitry coupled with the BB 1204A, the CPU 1204B, and/or the GPU 1204C that can communicatively couple the BB 1204A, the CPU 1204B, and/or the GPU 1204C to the memory/storage 1212 for retrieval of the computer-executable instructions (among other operations) from the memory/storage 1212 for execution.

In some embodiments, the baseband processor circuitry 1204A may access a communication protocol stack 1236 in the memory/storage 1212 to communicate over a 3GPP compatible network. In general, the baseband processor circuitry 1204A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 1208.

The baseband processor circuitry 1204A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 1212 may include one or more non-transitory, computer-readable media that includes instructions (for example, communication protocol stack 1236) that may be executed by one or more of the processors 1204 to cause the UE 1200 to perform various operations described herein. The memory/storage 1212 include any type of volatile or non-volatile memory that may be distributed throughout the UE 1200. In some embodiments, some of the memory/storage 1212 may be located on the processors 1204 themselves (for example, L1 and L2 cache), while other memory/storage 1212 is external to the processors 1204 but accessible thereto via a memory interface. The memory/storage 1212 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1208 may include transceiver circuitry and radio frequency front module (RFEM) that allows the UE 1200 to communicate with other devices over a radio access network. The RF interface circuitry 1208 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1226 and proceed to filter and amplify (with a low-noise amplifier) the signal. The signal may be provided to a receiver of the transceiver that down-converts the RF signal into a baseband signal that is provided to the baseband processor of the processors 1204.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1226.

In various embodiments, the RF interface circuitry 1208 may be configured to transmit/receive signals in a manner compatible with NR access technologies.

The antenna 1226 may include antenna elements to convert electrical signals into radio waves to travel through the air and to convert received radio waves into electrical signals. The antenna elements may be arranged into one or more antenna panels. The antenna 1226 may have antenna panels that are omnidirectional, directional, or a combination thereof to enable beamforming and multiple input, multiple output communications. The antenna 1226 may include microstrip antennas, printed antennas fabricated on the surface of one or more printed circuit boards, patch antennas, phased array antennas, etc. The antenna 1226 may have one or more panels designed for specific frequency bands including bands in FR1 or FR2.

In some embodiments, the UE 1200 may include the beamforming circuitry 1100 (FIG. 11), where the beamforming circuitry 1100 may be utilized for communication with the UE 1200. In some embodiments, components of the UE 1200 and the beamforming circuitry may be shared. For example, the antennas 1226 of the UE may include the panel 1 1104 and the panel 2 1108 of the beamforming circuitry 1100.

The user interface circuitry 1216 includes various input/output (I/O) devices designed to enable user interaction with the UE 1200. The user interface 1216 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 1200.

The sensors 1220 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1222 may include software and hardware elements that operate to control particular devices that are embedded in the UE 1200, attached to the UE 1200, or otherwise communicatively coupled with the UE 1200. The driver circuitry 1222 may include individual drivers allowing other components to interact with or control various input/output (I/O) devices that may be present within, or connected to, the UE 1200. For example, driver circuitry 1222 may include a display driver to control and allow access to a display device, a touchscreen driver to control and allow access to a touchscreen interface, sensor drivers to obtain sensor readings of sensor circuitry 1220 and control and allow access to sensor circuitry 1220, drivers to obtain actuator positions of electro-mechanic components or control and allow access to the electro-mechanic components, a camera driver to control and allow access to an embedded image capture device, audio drivers to control and allow access to one or more audio devices.

The PMIC 1224 may manage power provided to various components of the UE 1200. In particular, with respect to the processors 1204, the PMIC 1224 may control power-source selection, voltage scaling, battery charging, or DC-to-DC conversion.

In some embodiments, the PMIC 1224 may control, or otherwise be part of, various power saving mechanisms of the UE 1200. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 1200 may power down for brief intervals of time and thus save power. If there is no data traffic activity for an extended period of time, then the UE 1200 may transition off to an RRC_Idle state, where it disconnects from the network and does not perform operations such as channel quality feedback, handover, etc. The UE 1200 goes into a very low power state and it performs paging where again it periodically wakes up to listen to the network and then powers down again. The UE 1200 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1228 may power the UE 1200, although in some examples the UE 1200 may be mounted deployed in a fixed location, and may have a power supply coupled to an electrical grid. The battery 1228 may be a lithium ion battery, a metal-air battery, such as a zinc-air battery, an aluminum-air battery, a lithium-air battery, and the like. In some implementations, such as in vehicle-based applications, the battery 1228 may be a typical lead-acid automotive battery.

FIG. 13 illustrates an example gNB 1300 in accordance with some embodiments. The gNB 1300 may include processors 1304, RF interface circuitry 1308, core network (CN) interface circuitry 1312, memory/storage circuitry 1316, and antenna structure 1326.

The components of the gNB 1300 may be coupled with various other components over one or more interconnects 1328.

The processors 1304, RF interface circuitry 1308, memory/storage circuitry 1316 (including communication protocol stack 1310), antenna structure 1326, and interconnects 1328 may be similar to like-named elements shown and described with respect to FIG. 12.

The CN interface circuitry 1312 may provide connectivity to a core network, for example, a 5th Generation Core network (5GC) using a 5GC-compatible network interface protocol such as carrier Ethernet protocols, or some other suitable protocol. Network connectivity may be provided to/from the gNB 1300 via a fiber optic or wireless backhaul. The CN interface circuitry 1312 may include one or more dedicated processors or FPGAs to communicate using one or more of the aforementioned protocols. In some implementations, the CN interface circuitry 1312 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

In the following sections, further exemplary embodiments are provided.

Example 1 may include a method of operating a user equipment (UE) comprising receiving, from a base station, a channel state information (CSI) feedback configuration for artificial intelligence (AI)/machine learning (ML) based CSI feedback, configuring the UE in accordance with the CSI feedback configuration, performing measurements of one or more spatial beams received by the UE, generating a CSI feedback report, the CSI feedback report being generated in accordance with the CSI feedback configuration, and transmitting the CSI feedback report to the base station.

Example 2 may include the method of example 1, wherein the CSI feedback configuration includes an indication of a number of transceivers in a horizontal direction in an antenna array corresponding to the base station, a number of transceivers in a vertical direction in the antenna array, a first oversampling factor for the horizontal direction, and a second oversampling factor for the vertical direction, and configuring the UE in accordance with the CSI feedback configuration comprises configuring the UE based on the number of transceivers in the horizonal direction, the number of transceivers in the vertical direction, the first oversampling factor, and the second oversampling factor.

Example 3 may include the method of example 2, wherein the first oversampling factor is equal to four and the second oversampling factor is equal to four.

Example 4 may include the method of example 2, wherein the first oversampling factor is equal to four and the second oversampling factor is equal to one.

Example 5 may include the method of example 2, wherein the first oversampling factor is equal to one and the second oversampling factor is equal to one.

Example 6 may include the method of example 1, wherein the CSI feedback configuration includes an indication of spatial beams selected for the CSI feedback report for a first polarization, and configuring the UE in accordance with the CSI feedback configuration comprises configuring the UE to utilize the spatial beams for the first polarization and a second polarization.

Example 7 may include the method of example 1, wherein the CSI feedback configuration includes an indication of first spatial beams selected for the CSI feedback report for a first polarization and an indication of second spatial beams selected for the CSI feedback report for a second polarization, and configuring the UE in accordance with the CSI feedback configuration comprises configuring the UE to utilize the first spatial beams for the first polarization and to utilize the second spatial beams for the second polarization.

Example 8 may include the method of example 1, wherein the CSI feedback configuration includes an indication of a size of precoding matrix for the CSI feedback report, and configuring the UE in accordance with the CSI feedback configuration comprises generating a precoding matrix of the indicated size of precoding matrix.

Example 9 may include the method of example 8, wherein the size of precoding matrix is indicated as $(2 \times L)$ by N3, and wherein L comprises a number of spatial beams selected for a single polarization and N3 comprises a number of CSI subbands in a frequency domain for the CSI feedback report.

Example 10 may include the method of example 8, wherein the size of precoding matrix is indicated as L2 by N3, wherein L2 comprises a number of spatial beams selected for a first polarization and a second polarization, and wherein N3 comprises a number of CSI subbands in a frequency domain for the CSI feedback report.

Example 11 may include the method of example 1, wherein the CSI feedback configuration includes an indication of one or more forbidden beams that cannot be selected by the UE for the CSI feedback report, and configuring the UE in accordance with the CSI feedback configuration comprises configuring the UE to utilize one or more spatial beams that do not include the one or more forbidden beams for the CSI feedback report.

Example 12 may include the method of example 1, wherein the CSI feedback configuration includes an indication of one or more forbidden beams, and configuring the UE in accordance with the CSI feedback configuration comprises configuring the UE to set CSI feedback values for the one or more forbidden beams based on portions of the CSI feedback report adjacent to the one or more forbidden beams.

Example 13 may include the method of example 1, wherein configuring the UE in accordance with the CSI feedback configuration comprises configuring the UE to reflect a subset codebook restriction in a channel quality indicator (CQI) of the CSI feedback report.

Example 14 may include the method of example 1, wherein configuring the UE in accordance with the CSI feedback configuration comprises configuring the UE to utilize a precoder implementing a matrix of $$MP = \frac{1}{2N_1N_2}\tilde{W}_1\tilde{W}_1^H P, \text{ where } \tilde{W}_1 = \begin{bmatrix} BS & 0_{N_1N_2\times(N_1N_2-F)} \\ 0_{N_1N_2\times(N_1N_2-F)} & BS \end{bmatrix},$$

where $N_1$ comprises a number of rows of transceivers in an antenna array, where $N_2$ comprises a number of columns of the transceivers in an antenna array, where B comprises spatial beam indexes, where F comprises a number of forbidden beams at a polarization, where P comprises a precoder matrix of $2N_1N_2\times N_3$, where $N_3$ comprise a number of subbands, and where S comprises an indication of element vectors for the CSI feedback report.

Example 15 may include the method of example 1, wherein configuring the UE in accordance with the CSI feedback configuration comprises configuring the UE to utilize a precoder implementing a matrix of $$MRM^H = \frac{1}{2N_1N_2}\tilde{W}_1\tilde{W}_1^H R\left(\tilde{W}_1\tilde{W}_1^H\right)^H, \text{ where }$$

$$\tilde{W}_1 = \begin{bmatrix} BS & 0_{N_1N_2\times(N_1N_2-F)} \\ 0_{N_1N_2\times(N_1N_2-F)} & BS \end{bmatrix},$$

where $N_1$ comprises a number of rows of transceivers in an antenna array, where $N_2$ comprises a number of columns of the transceivers in an antenna array, where B comprises spatial beam indexes, where F comprises a number of forbidden beams at a polarization, where R comprises a subband covariance matrix, and where S comprises an indication of element vectors for the CSI feedback report.

Example 16 may include the method of example 1, wherein configuring the UE in accordance with the CSI feedback configuration comprises configuring the UE to utilize a precoder implementing a matrix of $$MRM^H = \frac{1}{2N_1N_2}\tilde{W}_1\tilde{W}_1^H R\left(\tilde{W}_1\tilde{W}_1^H\right)^H, \text{ where }$$

-continued
$$\tilde{W}_1 = \begin{bmatrix} BS & 0_{N_1N_2\times(N_1N_2-F)} \\ 0_{N_1N_2\times(N_1N_2-F)} & BS \end{bmatrix},$$

where $N_1$ comprises a number of rows of transceivers in an antenna array, where $N_2$ comprises a number of columns of the transceivers in an antenna array, where B comprises spatial beam indexes, where F comprises a number of forbidden beams at a polarization, where R comprises a wideband matrix, and where S comprises an indication of element vectors for the CSI feedback report.

Example 17 may include the method of example 1, wherein configuring the UE in accordance with the CSI feedback configuration comprises configuring the UE to have a ratio of a summation of a power of precoding matrix over a forbidden spatial beam to a maximum of summation of the power of precoding matrix over a non-forbidden spatial beam meet a defined power profile requirement.

Example 18 may include the method of example 17, wherein the power profile requirement comprises the ratio having a value of less than 0.5 or 0.25.

Example 19 may include the method of example 17, wherein the power profile requirement comprises the ratio having a value of 0.

Example 20 may include the method of example 1, wherein configuring the UE in accordance with the CSI feedback configuration comprises configuring the UE to have a ratio of a summation of a power of precoding matrix over a forbidden spatial beam to an average of summation of the power of precoding matrix over a non-forbidden spatial beam meet a defined power profile requirement.

Example 21 may include the method of example 20, wherein the power profile requirement comprises the ratio having a value of less than 0.5 or 0.25.

Example 22 may include the method of example 20, wherein the power profile requirement comprises the ratio having a value of 0.

Example 23 may include a method of operating a user equipment (UE) comprising measuring one or more beams received by the UE to produce channel state information (CSI), determining a CSI feedback configuration for artificial intelligence (AI)/machine learning (ML) based CSI feedback, generating a CSI feedback report to indicate the CSI for the one or more beams, the CSI feedback report generated in accordance with the CSI feedback configuration, and transmitting the CSI feedback report to a base station.

Example 24 may include the method of example 23, further comprising receiving, from the base station, configuration information for the CSI feedback configuration, and configuring the UE based on the configuration information.

Example 25 may include the method of example 24, wherein the configuration information includes an indication of a number of transceivers in a horizontal direction in an antenna array corresponding to the base station, a number of transceivers in a vertical direction in the antenna array, a first oversampling factor for the horizontal direction, and a second oversampling factor for the vertical direction.

Example 26 may include the method of example 25, wherein the first oversampling factor is equal to four and the second oversampling factor is equal to four.

Example 27 may include the method of example 25, wherein the first oversampling factor is equal to four and the second oversampling factor is equal to one.

Example 28 may include the method of example 25, wherein the first oversampling factor is equal to one and the second oversampling factor is equal to one.

Example 29 may include the method of example 24, wherein the configuration information includes an indication of spatial beams selected for the CSI feedback report for a first polarization, and configuring the UE based on the configuration information comprises configuring the UE to utilize the spatial beams for the first polarization and a second polarization.

Example 30 may include the method of example 24, wherein the configuration information includes an indication of first spatial beams selected for the CSI feedback report for a first polarization and an indication of second spatial beams selected for the CSI feedback report for a second polarization, and configuring the UE based on the configuration information comprises configuring the UE to utilize the first spatial beams for the first polarization and to utilize the second spatial beams for the second polarization.

Example 31 may include the method of example 24, wherein the configuration information includes an indication of a size of precoding matrix for the CSI feedback report, and configuring the UE based on the configuration information comprises generating a precoding matrix of the indicated size of precoding matrix.

Example 32 may include the method of example 31, wherein the size of precoding matrix is indicated as (2×L) by N3, and wherein L comprises a number of spatial beams selected for a single polarization and N3 comprises a number of CSI subbands in a frequency domain for the CSI feedback report.

Example 33 may include the method of example 31, wherein the size of precoding matrix is indicated as L2 by N3, wherein L2 comprises a number of spatial beams selected for a first polarization and a second polarization, and wherein N3 comprises a number of CSI subbands in a frequency domain for the CSI feedback report.

Example 34 may include the method of example 24, wherein the configuration information includes an indication of one or more forbidden beams that cannot be selected by the UE for the CSI feedback report, and configuring the UE based on the configuration information comprises configuring the UE to utilize one or more spatial beams that do not include the one or more forbidden beams for the CSI feedback report.

Example 35 may include the method of example 24, wherein the configuration information includes an indication of one or more forbidden beams, and configuring the UE based on the configuration information comprises configuring the UE to set CSI feedback values for the one or more forbidden beams based on portions of the CSI feedback report adjacent to the one or more forbidden beams.

Example 36 may include the method of example 24, wherein generating the CSI feedback report comprises generating a channel quality indicator (CQI) of the CSI feedback report to reflect a subset codebook restriction.

Example 37 may include the method of example 23, wherein generating the CSI feedback report comprises utilizing a precoder implementing a matrix of $$MP = \frac{1}{2N_1N_2} \tilde{W}_1 \tilde{W}_1^H P, \text{ where } \tilde{W}_1 = \begin{bmatrix} BS & 0_{N_1N_2 \times (N_1N_2-F)} \\ 0_{N_1N_2 \times (N_1N_2-F)} & BS \end{bmatrix},$$

where $N_1$ comprises a number of rows of transceivers in an antenna array, where $N_2$ comprises a number of columns of the transceivers in an antenna array, where B comprises spatial beam indexes, where F comprises a number of forbidden beams at a polarization, where P comprises a precoder matrix of $2N_1N_2 \times N_3$, where $N_3$ comprise a number of subbands, and where S comprises an indication of element vectors for the CSI feedback report.

Example 38 may include the method of example 23, wherein generating the CSI feedback report comprises utilizing a precoder implementing a matrix of $$MRM^H = \frac{1}{2N_1N_2} \tilde{W}_1 \tilde{W}_1^H R \left( \tilde{W}_1 \tilde{W}_1^H \right)^H, \text{ where}$$

$$\tilde{W}_1 = \begin{bmatrix} BS & 0_{N_1N_2 \times (N_1N_2-F)} \\ 0_{N_1N_2 \times (N_1N_2-F)} & BS \end{bmatrix},$$

where $N_1$ comprises a number of rows of transceivers in an antenna array, where $N_2$ comprises a number of columns of the transceivers in an antenna array, where B comprises spatial beam indexes, where F comprises a number of forbidden beams at a polarization, where R comprises a subband covariance matrix, and where S comprises an indication of element vectors for the CSI feedback report.

Example 39 may include the method of example 23, wherein generating the CSI feedback report comprises utilizing a precoder implementing a matrix of $$MRM^H = \frac{1}{2N_1N_2} \tilde{W}_1 \tilde{W}_1^H R \left( \tilde{W}_1 \tilde{W}_1^H \right)^H, \text{ where}$$

$$\tilde{W}_1 = \begin{bmatrix} BS & 0_{N_1N_2 \times (N_1N_2-F)} \\ 0_{N_1N_2 \times (N_1N_2-F)} & BS \end{bmatrix},$$

where $N_1$ comprises a number of rows of transceivers in an antenna array, where $N_2$ comprises a number of columns of the transceivers in an antenna array, where B comprises spatial beam indexes, where F comprises a number of forbidden beams at a polarization, where R comprises a wideband matrix, and where S comprises an indication of element vectors for the CSI feedback report.

Example 40 may include the method of example 23, wherein generating the CSI feedback report includes generating the CSI feedback report to have a ratio of a summation of a power of precoding matrix over a forbidden spatial beam to a maximum of summation of the power of precoding matrix over a non-forbidden spatial beam meet a defined power profile requirement.

Example 41 may include the method of example 40, wherein the power profile requirement comprises the ratio having a value of less than 0.5 or 0.25.

Example 42 may include the method of example 40, wherein the power profile requirement comprises the ratio having a value of 0.

Example 43 may include the method of example 23, wherein generating the CSI feedback report includes generating the CSI feedback report to have a ratio of a summation of a power of precoding matrix over a forbidden spatial beam to an average of summation of the power of precoding matrix over a non-forbidden spatial beam meet a defined power profile requirement.

Example 44 may include the method of example 43, wherein the power profile requirement comprises the ratio having a value of less than 0.5 or 0.25.

Example 45 may include the method of example 43, wherein the power profile requirement comprises the ratio having a value of 0.

Example 46 may include a method of operating a base station comprising generating a channel state information (CSI) feedback configuration message, the CSI feedback configuration message providing a CSI feedback configuration for artificial intelligence (AI)/machine learning (ML) based CSI feedback, transmitting, to a user equipment (UE), the CSI feedback configuration message, and receiving, from the UE, a CSI feedback report, the CSI feedback report in accordance with the CSI feedback configuration.

Example 47 may include the method of example 46 further comprising transmitting, to the UE, one or more spatial beams for CSI measurement by the UE, wherein the CSI feedback report is related to the one or more spatial beams.

Example 48 may include the method of example 46, wherein the CSI feedback configuration message includes an indication of a number of transceivers in a horizontal direction in an antenna array corresponding to the base station, a number of transceivers in a vertical direction in the antenna array, a first oversampling factor for the horizontal direction, and a second oversampling factor for the vertical direction.

Example 49 may include the method of example 48, wherein the first oversampling factor is equal to four and the second oversampling factor is equal to four.

Example 50 may include the method of example 48, wherein the first oversampling factor is equal to four and the second oversampling factor is equal to one.

Example 51 may include the method of example 48, wherein the first oversampling factor is equal to one and the second oversampling factor is equal to one.

Example 52 may include the method of example 46, wherein the CSI feedback configuration includes an indication of spatial beams selected for the CSI feedback report for a first polarization, the UE to be configured to utilize the spatial beams for the first polarization and a second polarization.

Example 53 may include the method of example 46, wherein the CSI feedback configuration includes an indication of first spatial beams selected for the CSI feedback report for a first polarization and an indication of second spatial beams selected for the CSI feedback report for a second polarization, the UE to be configured to utilize the first spatial beams for the CSI feedback report for the first polarization and to utilize the second spatial beams for the CSI feedback report for the second polarization.

Example 54 may include the method of example 46, wherein the CSI feedback configuration includes an indication of a size of precoding matrix for the CSI feedback report, the UE to generate a precoding matrix of the size of precoding matrix.

Example 55 may include the method of example 54, wherein the size of precoding matrix is indicated as (2×L) by N3, and wherein L comprises a number of spatial beams selected for a single polarization and N3 comprises a number of CSI subbands in a frequency domain for the CSI feedback report.

Example 56 may include the method of example 54, wherein the size of precoding matrix is indicated as L2 by N3, wherein L2 comprises a number of spatial beams selected for a first polarization and a second polarization, and wherein N3 comprises a number of CSI subbands in a frequency domain for the CSI feedback report.

Example 57 may include the method of example 46, wherein the CSI feedback configuration includes an indication of one or more forbidden beams that cannot be selected by the UE for the CSI feedback report.

Example 58 may include the method of example 46, wherein the CSI feedback configuration includes an indication of one or more forbidden beams, the UE to set CSI feedback values for the one or more forbidden beams based on portions of the CSI feedback report adjacent to the one or more forbidden beams.

Example 59 may include the method of example 46, wherein the CSI feedback configuration includes an indication of a precoder implementing a matrix of $$MP = \frac{1}{2N_1 N_2} \tilde{W}_1 \tilde{W}_1^H P, \text{ where } \tilde{W}_1 = \begin{bmatrix} BS & 0_{N_1 N_2 \times (N_1 N_2 - F)} \\ 0_{N_1 N_2 \times (N_1 N_2 - F)} & BS \end{bmatrix},$$

where $N_1$ comprises a number of rows of transceivers in an antenna array, where $N_2$ comprises a number of columns of the transceivers in an antenna array, where B comprises spatial beam indexes, where F comprises a number of forbidden beams at a polarization, where P comprises a precoder matrix of $2N_1 N_2 \times N_3$, where $N_3$ comprise a number of subbands, and where S comprises an indication of element vectors for the CSI feedback report.

Example 60 may include the method of example 46, wherein the CSI feedback configuration includes an indication of a precoder implementing a matrix of $$MRM^H = \frac{1}{2N_1 N_2} \tilde{W}_1 \tilde{W}_1^H R \left( \tilde{W}_1 \tilde{W}_1^H \right)^H, \text{ where}$$

$$\tilde{W}_1 = \begin{bmatrix} BS & 0_{N_1 N_2 \times (N_1 N_2 - F)} \\ 0_{N_1 N_2 \times (N_1 N_2 - F)} & BS \end{bmatrix},$$

where $N_1$ comprises a number of rows of transceivers in an antenna array, where $N_2$ comprises a number of columns of the transceivers in an antenna array, where B comprises spatial beam indexes, where F comprises a number of forbidden beams at a polarization, where R comprises a subband covariance matrix, and where S comprises an indication of element vectors for the CSI feedback report.

Example 61 may include the method of example 46, wherein the CSI feedback configuration includes an indication of a precoder implementing a matrix of $$MRM^H = \frac{1}{2N_1 N_2} \tilde{W}_1 \tilde{W}_1^H R \left( \tilde{W}_1 \tilde{W}_1^H \right)^H, \text{ where}$$

$$\tilde{W}_1 = \begin{bmatrix} BS & 0_{N_1 N_2 \times (N_1 N_2 - F)} \\ 0_{N_1 N_2 \times (N_1 N_2 - F)} & BS \end{bmatrix},$$

where $N_1$ comprises a number of rows of transceivers in an antenna array, where $N_2$ comprises a number of columns of the transceivers in an antenna array, where B comprises spatial beam indexes, where F comprises a number of forbidden beams at a polarization, where R comprises a wideband matrix, and where S comprises an indication of element vectors for the CSI feedback report.

Example 62 may include the method of example 46, further comprising identifying CSI corresponding to forbidden beams in the CSI feedback report, and disregarding the CSI corresponding to the forbidden beams.

Example 63 may include the method of example 46, wherein the CSI feedback configuration indicates that the CSI feedback report is to have a ratio of a summation of a power of precoding matrix over a forbidden spatial beam to a maximum of summation of the power of precoding matrix over a non-forbidden spatial beam meet a defined power profile requirement.

Example 64 may include the method of example 63, wherein the power profile requirement comprises the ratio having a value of less than 0.5 or 0.25.

Example 65 may include the method of example 63, wherein the power profile requirement comprises the ratio having a value of 0.

Example 66 may include the method of example 46, wherein the CSI feedback configuration indicates that the CSI feedback report is to have a ratio of a summation of a power of precoding matrix over a forbidden spatial beam to an average of summation of the power of precoding matrix over a non-forbidden spatial beam meet a defined power profile requirement.

Example 67 may include the method of example 66, wherein the power profile requirement comprises the ratio having a value of less than 0.5 or 0.25.

Example 68 may include the method of example 66, wherein the power profile requirement comprises the ratio having a value of 0.

Example 69 may include an apparatus comprising means to perform one or more elements of a method described in or related to any of examples 1-68, or any other method or process described herein.

Example 70 may include one or more non-transitory computer-readable media comprising instructions to cause an electronic device, upon execution of the instructions by one or more processors of the electronic device, to perform one or more elements of a method described in or related to any of examples 1-68, or any other method or process described herein.

Example 71 may include an apparatus comprising logic, modules, or circuitry to perform one or more elements of a method described in or related to any of examples 1-68, or any other method or process described herein.

Example 72 may include a method, technique, or process as described in or related to any of examples 1-68, or portions or parts thereof.

Example 73 may include an apparatus comprising: one or more processors and one or more computer-readable media comprising instructions that, when executed by the one or more processors, cause the one or more processors to perform the method, techniques, or process as described in or related to any of examples 1-68, or portions thereof.

Example 74 may include a signal as described in or related to any of examples 1-68, or portions or parts thereof.

Example 75 may include a datagram, information element, packet, frame, segment, PDU, or message as described in or related to any of examples 1-68, or portions or parts thereof, or otherwise described in the present disclosure.

Example 76 may include a signal encoded with data as described in or related to any of examples 1-68, or portions or parts thereof, or otherwise described in the present disclosure.

Example 77 may include a signal encoded with a datagram, IE, packet, frame, segment, PDU, or message as described in or related to any of examples 1-68, or portions or parts thereof, or otherwise described in the present disclosure.

Example 78 may include an electromagnetic signal carrying computer-readable instructions, wherein execution of the computer-readable instructions by one or more processors is to cause the one or more processors to perform the method, techniques, or process as described in or related to any of examples 1-68, or portions thereof.

Example 79 may include a computer program comprising instructions, wherein execution of the program by a processing element is to cause the processing element to carry out the method, techniques, or process as described in or related to any of examples 1-68, or portions thereof.

Example 80 may include a signal in a wireless network as shown and described herein.

Example 81 may include a method of communicating in a wireless network as shown and described herein.

Example 82 may include a system for providing wireless communication as shown and described herein.

Example 83 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory, computer-readable media having instructions that, when executed, cause processing circuitry to:

identify a channel state information (CSI) feedback configuration for artificial intelligence (AI)/machine learning (ML) based CSI feedback received from a base station, the CSI feedback configuration including an indication of at least one forbidden beam;

perform measurements of at least one received spatial beam in accordance with the CSI feedback configuration; and generate a CSI feedback report for transmission to the base station, the CSI feedback report being generated in accordance with the CSI feedback configuration, and CSI feedback values for the at least one forbidden beam being set based at least in part on a power of a precoding matrix of at least one non-forbidden spatial beam of the CSI feedback report.

2. The one or more non-transitory, computer-readable media of claim 1, wherein:

the CSI feedback configuration includes an indication of a number of transceivers in a horizontal direction in an antenna array corresponding to the base station, a number of transceivers in a vertical direction in the antenna array, a first oversampling factor for the horizontal direction, and a second oversampling factor for the vertical direction; and to perform the measurements comprises to perform the measurements based at least in part on the number of transceivers in the horizontal direction, the number of transceivers in the vertical direction, the first oversampling factor, and the second oversampling factor.

3. The one or more non-transitory, computer-readable media of claim 1, wherein:

the CSI feedback configuration includes an indication of spatial beams selectable for the CSI feedback report for a first polarization; and to perform the measurements comprises to utilize a subset of the spatial beams selectable for the first polarization and a second polarization.

4. The one or more non-transitory, computer-readable media of claim 1, wherein:

the CSI feedback configuration includes an indication of first spatial beams selectable for the CSI feedback report for a first polarization and an indication of second spatial beams selected for the CSI feedback report for a second polarization; and to perform the measurements comprises to utilize a subset of the first spatial beams selectable for the first polarization and to utilize the second spatial beams for the second polarization.

5. The one or more non-transitory, computer-readable media of claim 1, wherein:

the CSI feedback configuration includes an indication of a size of precoding matrix for the CSI feedback report; and to generate the CSI feedback report comprises to generate a precoding matrix of the indicated size of precoding matrix.

6. The one or more non-transitory, computer-readable media of claim 1, wherein:

to generate the CSI feedback report comprises to utilize one or more spatial beams that do not include the at least one forbidden beam for the CSI feedback report.

7. The one or more non-transitory, computer-readable media of claim 1, wherein to generate the CSI feedback report comprises to reflect a subset codebook restriction in a channel quality indicator (CQI) of the CSI feedback report.

8. The one or more non-transitory, computer-readable media of claim 1, wherein to generate the CSI feedback report comprises to have a ratio of a summation of a power of precoding matrix over a forbidden spatial beam to a maximum of summation of the power of precoding matrix over a non-forbidden spatial beam that meets a defined power profile requirement.

9. The one or more non-transitory, computer-readable media of claim 1, wherein to generate the CSI feedback report comprises to have a ratio of a summation of a power of precoding matrix over a forbidden spatial beam to an average of summation of the power of precoding matrix over a non-forbidden spatial beam that meets a defined power profile requirement.

10. An apparatus comprising:

processing circuitry to:

measure at least one received beam to produce channel state information (CSI);

determine a CSI feedback configuration for artificial intelligence (AI)/machine learning (ML) based CSI feedback; and generate, for transmission to a base station, a CSI feedback report to indicate the CSI for the at least one received beam, the CSI feedback report generated in accordance with the CSI feedback configuration, wherein to generate the CSI feedback report comprises to:

utilize a precoder implementing a matrix of $$MP = \frac{1}{2N_1N_2}\tilde{W}_1\tilde{W}_1^H P, \text{ where } \tilde{W}_1 = \begin{bmatrix} BS & 0_{N_1N_2\times(N_1N_2-F)} \\ 0_{N_1N_2\times(N_1N_2-F)} & BS \end{bmatrix},$$

where $N_1$ comprises a number of rows of transceivers in an antenna array, where $N_2$ comprises a number of columns of the transceivers in an antenna array, where B comprises spatial beam indexes, where F comprises a number of forbidden beams at a polarization, where P comprises a precoder matrix of $2N_1N_2\times N_3$, where $N_3$ comprise a number of subbands, and where S comprises an indication of element vectors for the CSI feedback report; or utilize a precoder implementing a matrix of $$MRM^H = \frac{1}{2N_1N_2}\tilde{W}_1\tilde{W}_1^H R\left(\tilde{W}_1\tilde{W}_1^H\right)^H, \text{ where}$$

$$\tilde{W}_1 = \begin{bmatrix} BS & 0_{N_1N_2\times(N_1N_2-F)} \\ 0_{N_1N_2\times(N_1N_2-F)} & BS \end{bmatrix},$$

where $N_1$ comprises a number of rows of transceivers in an antenna array, where N2 comprises a number of columns of the transceivers in an antenna array, where B comprises spatial beam indexes, where F comprises a number of forbidden beams at a polarization, where R comprises a subband covariance matrix or a wideband matrix, and where S comprises an indication of element vectors for the CSI feedback report; and interface circuitry coupled with the processing circuitry, the interface circuitry to transmit the CSI feedback report.

11. The apparatus of claim 10, wherein the processing circuitry is further to:

identify configuration information for the CSI feedback configuration received from the base station; and configure the apparatus based at least in part on the configuration information.

12. The apparatus of claim 11, wherein the configuration information includes an indication of a number of transceivers in a horizontal direction in an antenna array corresponding to the base station, a number of transceivers in a vertical direction in the antenna array, a first oversampling factor for the horizontal direction, and a second oversampling factor for the vertical direction.

13. The apparatus of claim 11, wherein:

the configuration information includes an indication of spatial beams selected for the CSI feedback report for a first polarization; and to configure the apparatus based at least in part on the configuration information comprises to configure the apparatus to utilize the spatial beams for the first polarization and a second polarization.

14. A method comprising:

generating a channel state information (CSI) feedback configuration message for transmission to a user equipment (UE), the CSI feedback configuration message providing a CSI feedback configuration for artificial intelligence (AI)/machine learning (ML) based CSI feedback, wherein the CSI feedback configuration indicates to have a ratio of a summation of a power of precoding matrix over a forbidden spatial beam to a maximum or an average of a summation of the power of precoding matrix over a non-forbidden spatial beam that meets a defined power profile requirement; and identifying a CSI feedback report received from the UE, the CSI feedback report in accordance with the CSI feedback configuration.

15. The method of claim 14, wherein the CSI feedback configuration message includes an indication of a number of transceivers in a horizontal direction in an antenna array corresponding to a base station, a number of transceivers in a vertical direction in the antenna array, a first oversampling factor for the horizontal direction, and a second oversampling factor for the vertical direction.

16. The method of claim 14, wherein the CSI feedback configuration includes an indication of first spatial beams selected for the CSI feedback report for a first polarization and an indication of second spatial beams selected for the CSI feedback report for a second polarization, the UE to be configured to utilize the first spatial beams for the CSI feedback report for the first polarization and to utilize the second spatial beams for the CSI feedback report for the second polarization.

* * * * *